US012600210B2

(12) United States Patent
Janssen

(10) Patent No.: US 12,600,210 B2
(45) Date of Patent: Apr. 14, 2026

(54) NON-MOTORIZED RETRACTABLE ROOF COMPONENT

(71) Applicant: Steven J Janssen, Birmingham, MI (US)

(72) Inventor: Steven J Janssen, Birmingham, MI (US)

( * ) Notice: Subject to any disclaimer, the term of this patent is extended or adjusted under 35 U.S.C. 154(b) by 405 days.

(21) Appl. No.: 17/277,111

(22) PCT Filed: Dec. 8, 2020

(86) PCT No.: PCT/US2020/063852
§ 371 (c)(1),
(2) Date: Mar. 17, 2021

(87) PCT Pub. No.: WO2022/125080
PCT Pub. Date: Jun. 16, 2022

(65) Prior Publication Data
US 2022/0402340 A1 Dec. 22, 2022

Related U.S. Application Data

(63) Continuation-in-part of application No. 15/431,727, filed on Feb. 13, 2017, now Pat. No. 10,857,860.

(60) Provisional application No. 62/294,335, filed on Feb. 12, 2016.

(51) Int. Cl.
*B60J 7/043* (2006.01)
*B60J 7/04* (2006.01)
*B60J 7/19* (2006.01)

(52) U.S. Cl.
CPC ............ B60J 7/0435 (2013.01); B60J 7/042 (2013.01); B60J 7/043 (2013.01); B60J 7/192 (2013.01)

(58) Field of Classification Search
CPC . B60J 7/043; B60J 7/0435; B60J 7/192; B60J 7/11
USPC ............ 296/216.02–216.5, 224, 216.09, 218
See application file for complete search history.

(56) References Cited

U.S. PATENT DOCUMENTS

| | | | | |
|---|---|---|---|---|
| 9,845,002 | B2 * | 12/2017 | Nellen | B60J 7/047 |
| 10,773,579 | B2 * | 9/2020 | Willard | B60J 7/11 |
| 2014/0246885 | A1 * | 9/2014 | Inzerillo | B60J 7/02 |
| | | | | 296/218 |

* cited by examiner

*Primary Examiner* — Dennis H Pedder
(74) *Attorney, Agent, or Firm* — Cargill & Associates, PLLC; Lynn E. Cargill

(57) ABSTRACT

A non-motorized panoramic retractable hard panel roof, desirable for most sport vehicle owners is disclosed. A manually operated, rear retractable hard panel roof assembly is capable of being manually opened and closed without a need to leave the driver compartment. The present design is a semi-permanent driver compartment enclosure, easy to install and remove by the driver without requiring any outside assistance, and one that can easily be modified from the factory roof panels to the configuration of the present invention, as well as being easily changed back to the original configuration from the factory. Because it is semi-permanent, the roof panel does not need to be removed, thereby alleviating any need to store the panel away from the vehicle. The present retractable assembly can easily be attached to the vehicle without interrupting any of the original functionality of the vehicle, and without the need for any special tools. By relatively simple attachments, the roof panel assembly may be used to attach it to the vehicle without any need to modify the original factory vehicle roof.

15 Claims, 32 Drawing Sheets

FIG. 17A
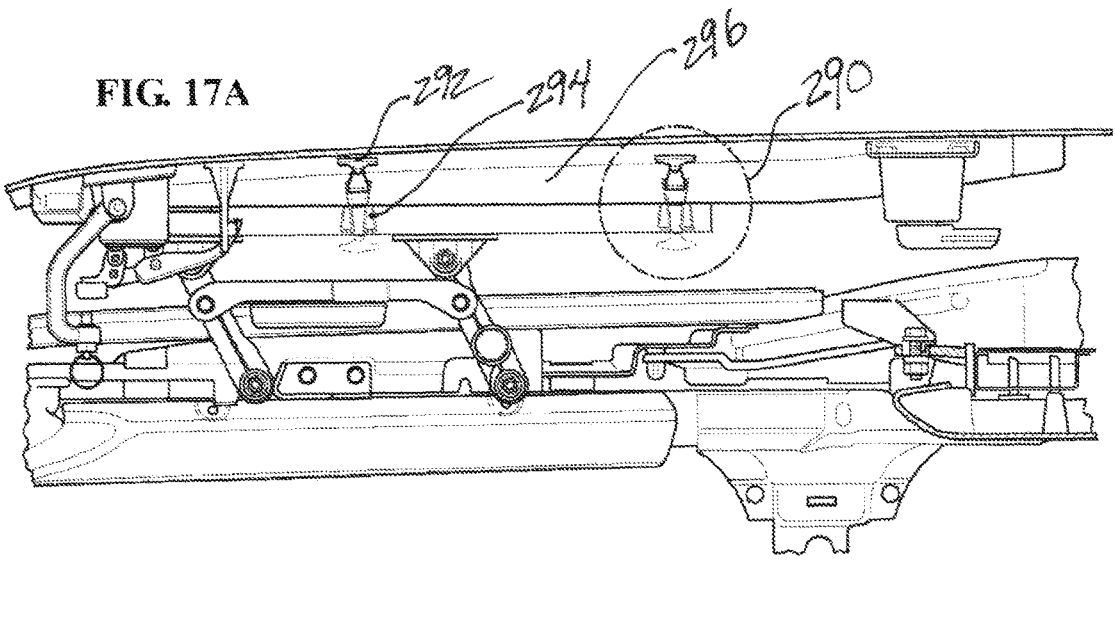
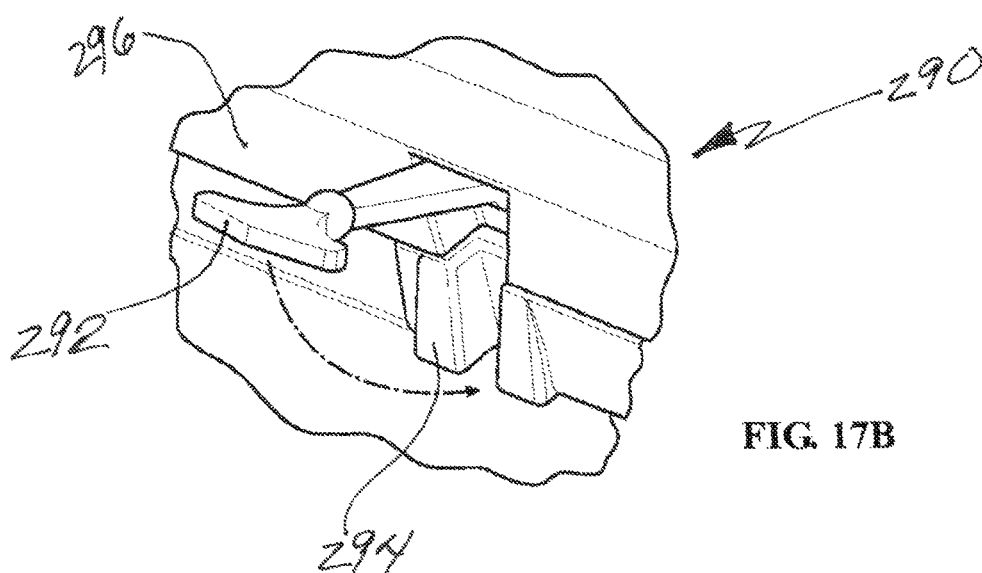
FIG. 17B

NON-MOTORIZED RETRACTABLE ROOF COMPONENT

CROSS-REFERENCE TO RELATED APPLICATIONS

This application is a Continuation in Part (CIP) of U.S. application Ser. No. 15/431,727, filed on Feb. 13, 2017, which claims the benefit under 35 U.S.C. 119(e) of U.S. Provisional Application No. 62/294,335 filed on Feb. 12, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a new type of non-motorized, retractable automotive roof especially useful for sport type vehicles, including various sliding mechanisms, and particularly relates to a non-motorized retractable panoramic hard roof panel.

2. Description of the Prior Art

In addition to every day driving, off-road capable sports vehicles are becoming increasingly popular vehicles in the automotive market for recreational purposes because the owners of those vehicles enjoy the out-of-doors. Those that want to feel as though they are out-of-doors while driving, have been drawn to own sport vehicles. However, to make them useful in many weather conditions, various forms of soft and removable hard roof panels have been promoted in the past. One of these prior art roof styles has included removable hard roof panels on either side of the vehicle, requiring removal and storage of the removed panels. Moreover, these conventional hard roof panels are heavy and bulky and generally require more than one person to lift it up off the sport vehicle for removal in order to experience open air driving. When unexpected rainfall occurs, it is an unpleasant task to retrieve the hard roof panels and hurriedly put them back into position to seal them back into place to cover the interior before it would become soaking wet. While owners of sports vehicles have enjoyed the advantage of a hard-top that is factory installed, including the features of open-air driving and increased security, there are some common complaints that are widely noted throughout the vibrant sport vehicle owner community. The problems include heavy, awkward removable panels that are cumbersome because once the panels are removed, owners must look for a storage space for the removed panels. If the vehicle owner wants to store the panels within the vehicle, they will find that a large amount of the vehicle's storage space is consumed once they are stored. There is also a problem of inherent damage that occurs in the removal, stowage, and installation process of these panels. Furthermore, another problem arises if the vehicle owner wants to use any type of a cargo or storage rack because the hard top must stay attached to the vehicle in order to accommodate various other cargo and storage racks like the ones that are available in the aftermarket. This problem occurs because they have to accommodate the drip rail. Aesthetically speaking, this configuration for the hardtop that is offered by the factory creates a closed-in and dark driving environment. For example, close to 70% of all Jeep Wrangler® purchasers ask for their Freedom™ panel option, and they are looking for an aftermarket alternative that is easy to install so that they may purchase it and install it themselves.

On the other hand, motorized sunroofs with sliding roof panels have been promoted to solve these problems. However, they require cutting a hole in the vehicle roof and factory installing hard roof panels along with motors and wiring which add weight and complexity and typically require factory dealers or professional aftermarket to service and maintain reliable operation.

In still another attempt to provide a removable aftermarket roof, prior attempts have been very limited in appeal as they also require a full hardtop which may require a small crane for removal. Like the removable cab for a pick-up truck, the entire hardtop must be removed. Then, the issue of storage arises, which the Internet has many storage solutions, although they take up a one car garage space for storage. Furthermore, while it is removable, significant effort and tools are needed to remove the roof from the vehicle typically by several people, and storage was extremely challenging due to size, weight, potential damage to the roof during transfer and loss of protection from an unexpected rain storm.

It has been a recognized advantage by others to provide a new type of retractable roof that is easy to install, easy to use, and one which stays on the vehicle, alleviating storage problems. Previously, though, in order to achieve this goal, others have provided a soft top that typically utilizes fabric that folds on top of itself to create an opening. However, problems have arisen with those designs. Primary concerns with a soft fabric type of roof covering is the flapping of the fabric during high speed driving, inability to secure the vehicle and its contents, ambient noise while driving with the soft panel closed and lack of warmth and weatherability in the winter. Surely, one would not want to have to listen to flapping fabric while driving down the expressway.

It would be a great advantage to sport vehicle owners if they could purchase a retractable hard panel that is easy to self-install, easy to remove and revert back to the factory installed roof and can be added to the vehicle without any vehicle modifications. It would be most advantageous if it could be fully operated from within the driver compartment, especially when the weather changes quickly.

SUMMARY OF THE INVENTION

The present invention provides a new non-motorized, self storing, hard panel retractable roof, configured for sport vehicles, that readily adapts to being quickly mounted on the original factory structure of various sport-type vehicles without modification to the vehicle, whether semi-permanently or even somewhat permanently. The present invention quickly clips onto the existing vehicle structure. Various lift, retracting and locking mechanisms for retracting the roof into an open position are disclosed. By designing the present invention to be easily and semi-permanently mountable to an existing vehicle structure, installation on the vehicle may be easily accomplished without damaging or modifying the existing configuration of the factory vehicle.

For example, the present design is adapted to replace the individual Freedom Panels offered on the current model of the Jeep Wrangler®, available from FCA US, LLC of Auburn Hills, Michigan. A problem arises because Freedom™ panels require physical removal and storage. A particular advantage of the present invention is that the instant hard panel roof panel can remain on the vehicle and is self-storing while in both the open and closed positions so that no one needs to remove the roof panel or store the roof panels elsewhere. In a first aspect, this configuration may be comprised of two roof rails that slidably support a roof panel made of suitable materials including either opaque, transparent or translucent hard composite polycarbonate, glass, tempered glass, Gorilla Glass®, available from Corning Glass Works of Corning N.Y., metal, fiberglass, combinations thereof or any other similar suitable material. This aspect allows for speedy do-it-yourself installation without the need for special tools and using only commercially available tools.

The present design also means that quick and easy opening and closing of the hard panel roof is achievable by manually retracting the roof panel from inside the driver compartment, so weather changes are immediately accommodated without leaving the driver compartment. Envision that you are enjoying a beautiful sunny day with your roof panel retracted and a sudden rainstorm comes up. By utilizing the present invention, you can remain in your car seat, reach back to grab the handle and pull it shut within seconds, all without having to get out in the rain. Previously one would have to leave the vehicle, retrieve your removable roof Jeep® Freedom panels that you stored in the back of your sport vehicle and re-attach them onto your roof while you and your vehicle interior get soaking wet.

Further, this design allows for the installation of sport and cargo racks, even while the present retractable roof is in an open position. Prior art motorized retractable roofs made such installations impossible.

Moreover, this retractable roof configuration offers improved security when used in conjunction with an existing hard top and a locking rear glass tailgate. In addition to this, other benefits are also realized such as easy weather adaptability, the ability to accommodate mounting of cargo and sports racks, leak resistance, lack of rattles and maintenance, as well as a lack for a need of any motors and/or wires.

Whether the present roof structure is in the open or closed position, different aspects include at least one retracting mechanism described more fully hereinbelow which allows for retaining, retracting and self-storing of the roof panel. The roof panel can be easily moved from the closed position, the open position, and various positions in between, depending upon the preference of the driver. The instant roof panel may pivot, lift and retract to provide an opening extending from the windshield frame to the rear of the original factory structure without any obstruction. Linkage between the mounted brackets of the frame structure and the retractable retracting hard panel help to make lifting the panel and retracting it to the rear a simple task that even limited ability drivers can operate from inside the vehicle.

In yet another aspect of the present invention, disclosed is a single roof panel that seals against existing factory installed front and rear weather-strip seals. Additional seals may be added to the left and right side of the roof panel creating a 360° weather resistant and leak proof hard surface enclosure over the driver's compartment.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, and wherein:

FIG. 17A is a bottom plan view of another aspect of the squeeze release;

FIG. 17B is a side elevational view of a T-shaped locking mechanism in an unlocked position;

A more complete and full understanding of the aspects and nature of the present invention will become apparent upon considering the following detailed description, when taken in connection with the accompanying drawings.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects, which will be obvious to those of ordinary skill in the art all without departing from the spirit of the present invention. Accordingly, the rest of the description will be regarded as illustrative rather than restrictive.

DETAILED DESCRIPTION OF THE INVENTION

Therefore, in accordance with the present invention, disclosed is a new non-motorized retractable panoramic hard roof panel for sport vehicles. Now we look at this innovation in the present invention. The present design is a semi-permanent driver compartment enclosure, easy to install and removable by the driver without requiring any outside assistance, and one that can easily be modified from the factory roof panels to the configuration of the present invention, as well as being easily changed back to the original configuration from the factory.

As can also be seen clearly from the appended drawings, various aspects of the present invention are particularly amenable to attaching the present retractable hard roof panel assembly to a sport vehicle by its supporting brackets. This feature means that the present retractable assembly can easily be attached to the vehicle without interrupting any of the original functionality of the vehicle. By relatively simple attachments, the present hard roof panel assembly may be used to attach it to the vehicle without any need to modify the original factory vehicle roof.

Figure 1A:
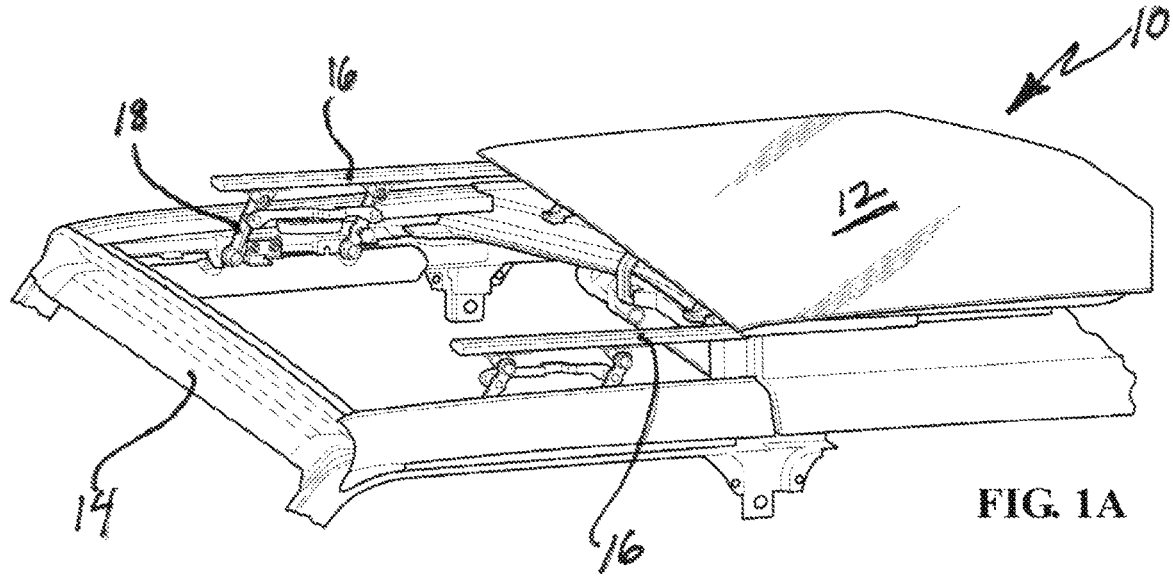
FIG. 1A is an environmental view of a sport type vehicle with a retracted hard roof panel made in accordance with the present invention.
Figure 1B:
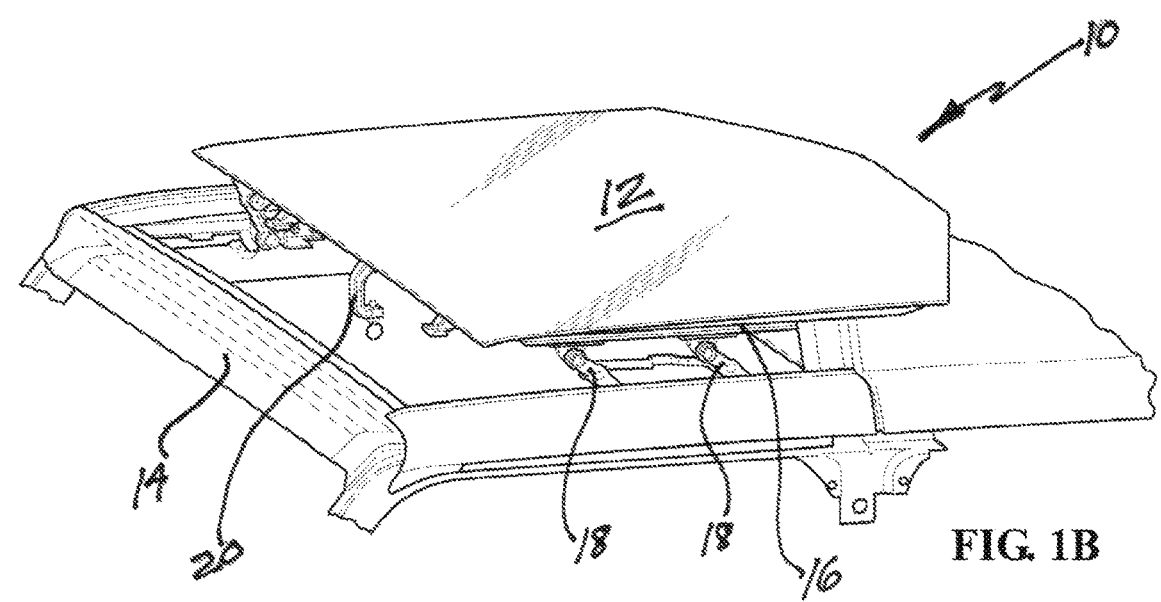
FIG. 1B is an environmental view of the sport type vehicle of FIG. 1A with the hard roof panel partially retracted.
Figure 1C:
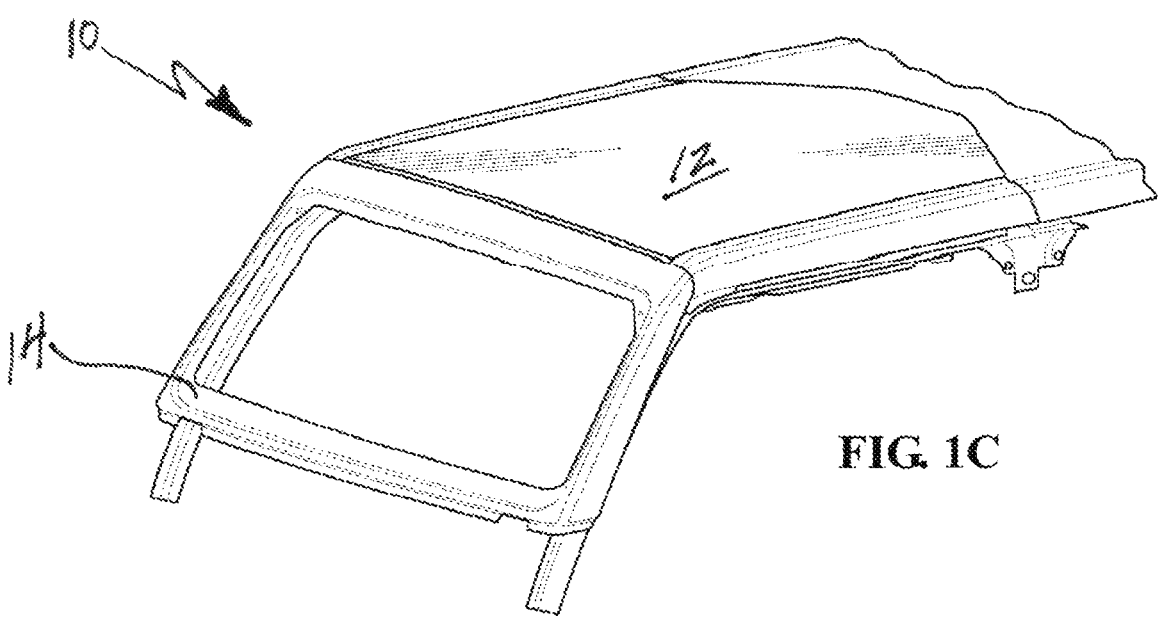
FIG. 1C is an environmental view of the sport type vehicle of FIG. 1A with the hard roof panel in a fully closed position.
Figure 1D:
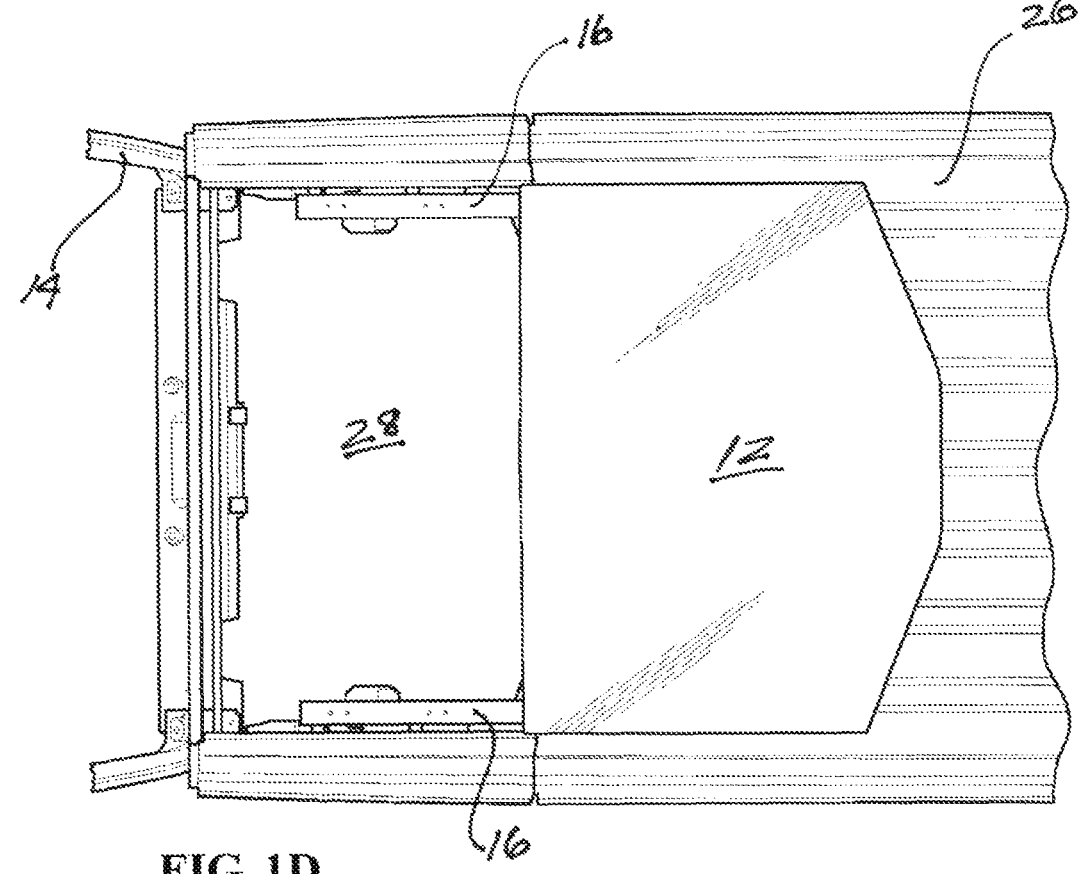
FIG. 1D is a top plan view of the sport type vehicle of FIG. 1A with the hard roof panel in the fully closed position.
Figure 1E:
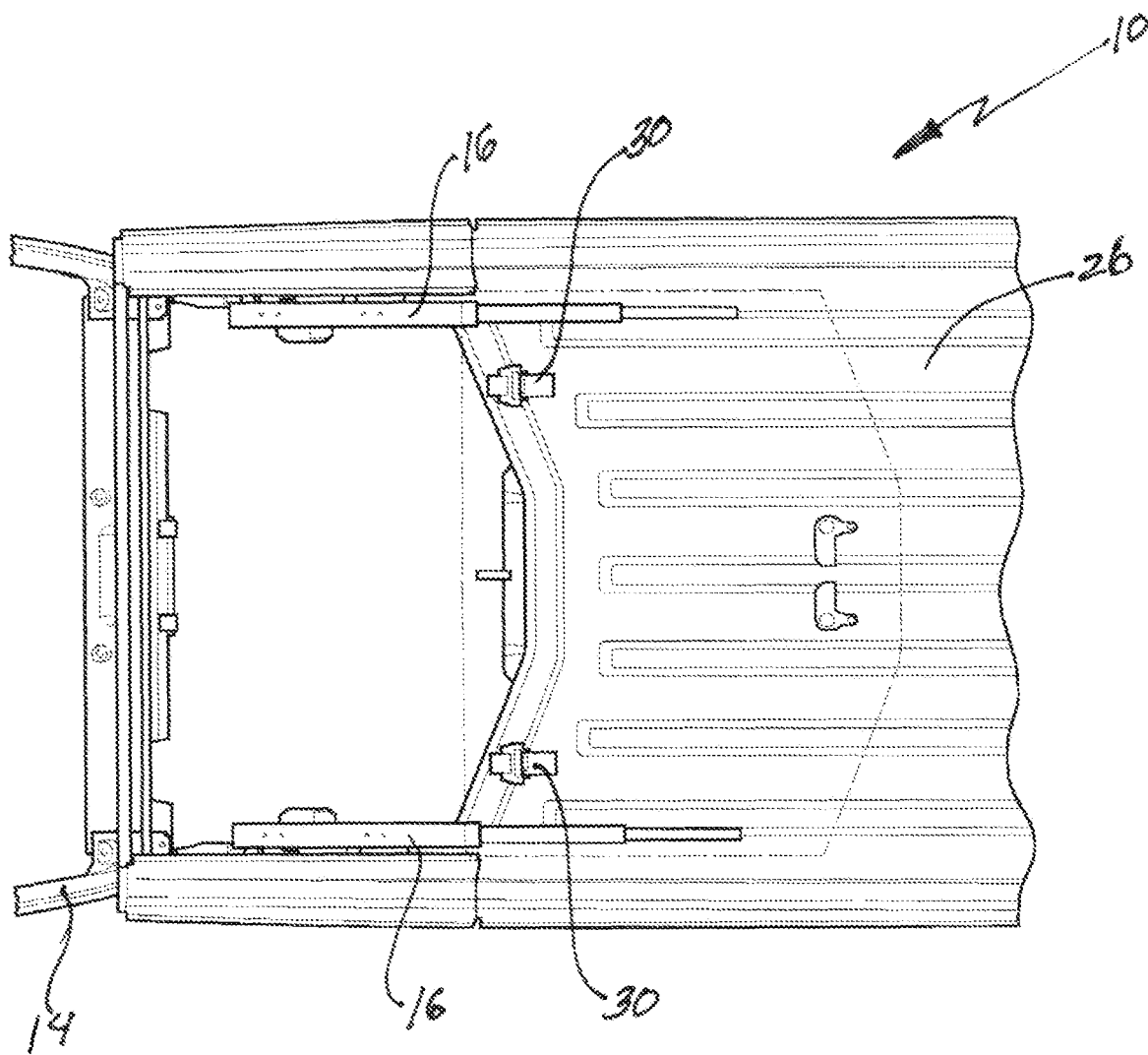
FIG. 1E is a top plan view of the sport type vehicle of FIG. 1A with the hard roof panel in the fully closed position, illustrating the hard roof panel in phantom in an open position, and the relative placement of a first aspect of latches to secure the roof panel in a closed position.

Referring collectively now to the drawings, FIGS. 1A-1E, illustrating a non-motorized retractable hard roof panel made in accordance with the present invention generally known by the numeral 10 including a hard roof panel 12 removably mounted to vehicle structure 14. Roof panel support rails 16 are capable of being lifted by struts 18 to retract the hard roof panel over vehicle structure 14. FIG. 1B shows hard roof panel 12 in an intermediate position, proceeding toward the closed position. Struts 18 are synchronized to effect efficient lifting and retracting. FIG. 1C shows the hard roof panel in its closed position on top of vehicle structure 14. FIG. 1D is a top plan view of the hard roof panel in its retracted position over vehicle roof 26, exposing cabin interior 28. FIG. 1E illustrates a clear hard roof panel in phantom, showing relative placement of roof panel securement latches 30, which are utilized to secure the hard roof panel in the closed position.

Figures 2A, 2B:
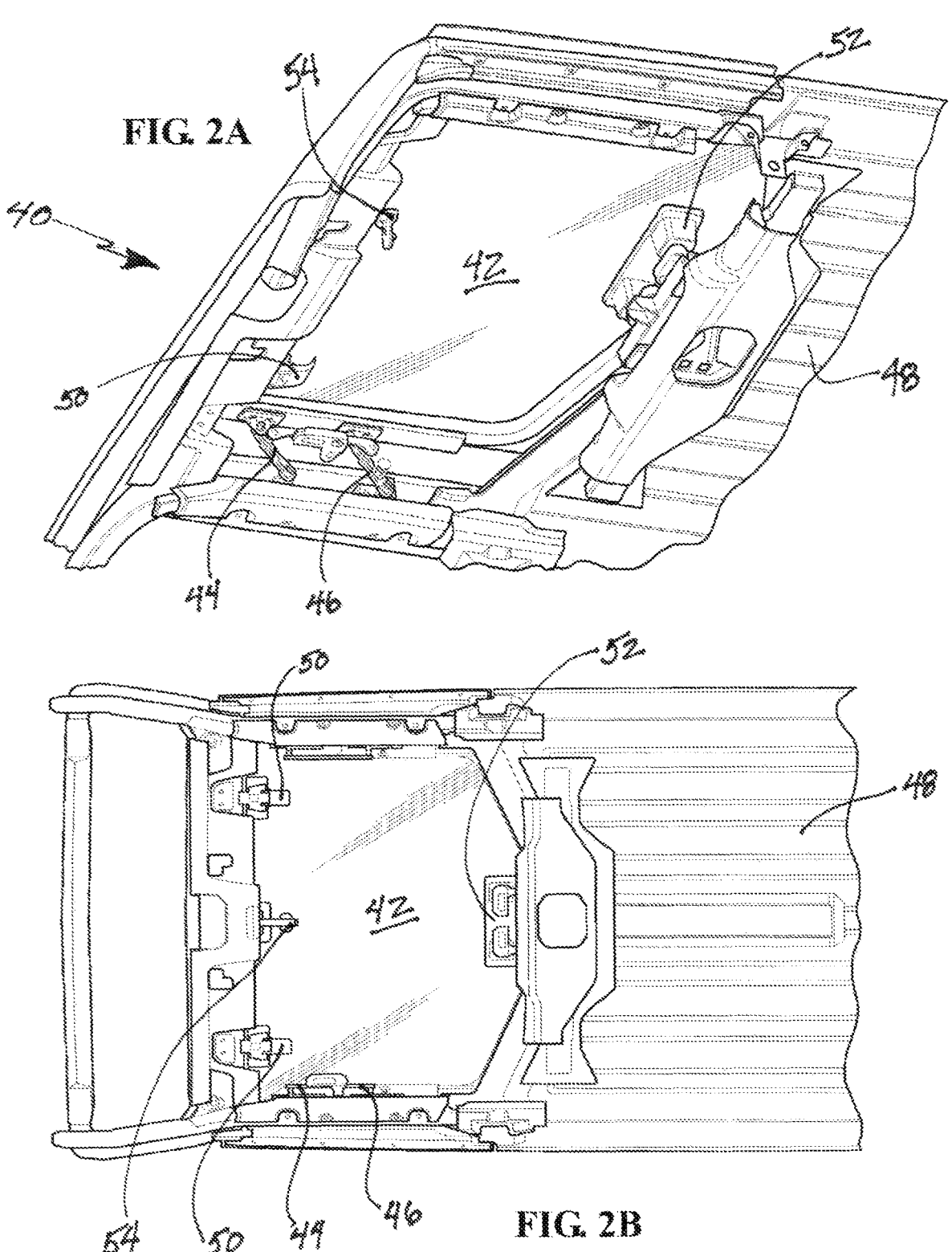
FIG. 2A is a perspective view from underneath of a non-motorized panoramic retracting hard roof panel made in accordance with an aspect of the present invention.
FIG. 2B is a bottom plan view from underneath of the non-motorized panoramic retracting hard roof panel made in accordance with the aspect of the present invention shown in FIG. 2A.
Figure 2C:
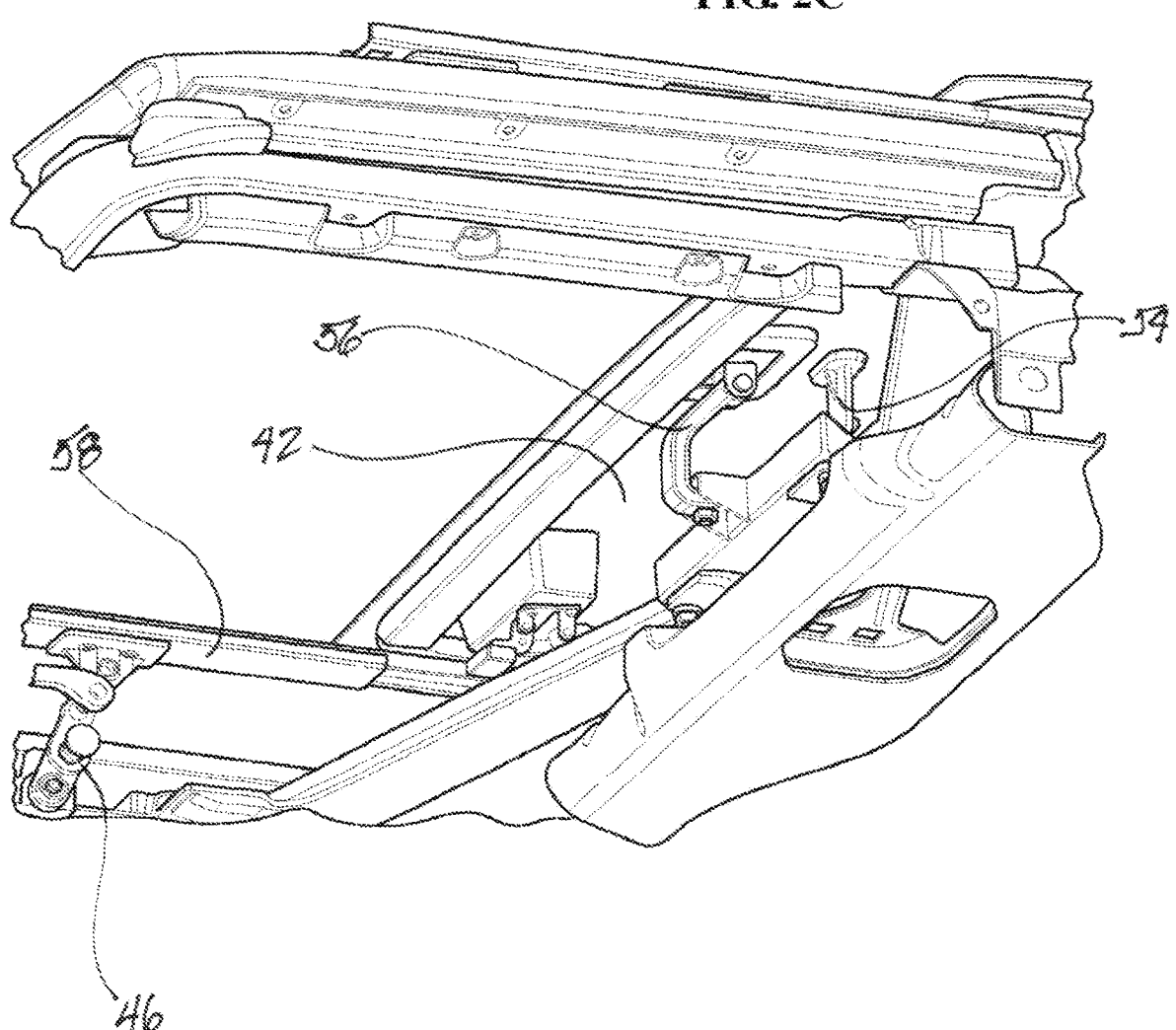
FIG. 2C is a perspective view from underneath the non-motorized panoramic retracting hard roof panel made in accordance with an aspect of the present invention shown in FIG. 2A, detailing an open position.

FIGS. 2A-2C provide views from inside the cabin interior of the sport vehicle underneath hard roof panel 42 and vehicle roof 48. wherein the assembly is generally denoted by numeral 40, including hard roof panel 42 in a closed position, supported by first and second struts 44 and 46 respectively. A handle 56 is used to open the hard panel roof 42 and can be secured by latches 50 when in the closed position. Receiving post 54 will secure handle 56. FIG. 2B is a bottom plan view illustrating the relative placement of the latches 50. Support rails 58 in FIG. 2C provide retractability when handle 56 is urged rearwardly by an occupant in the cabin interior of the vehicle. Handle 56 is adhered to hard roof panel 42 by handle support blocks 52.

Figure 3:
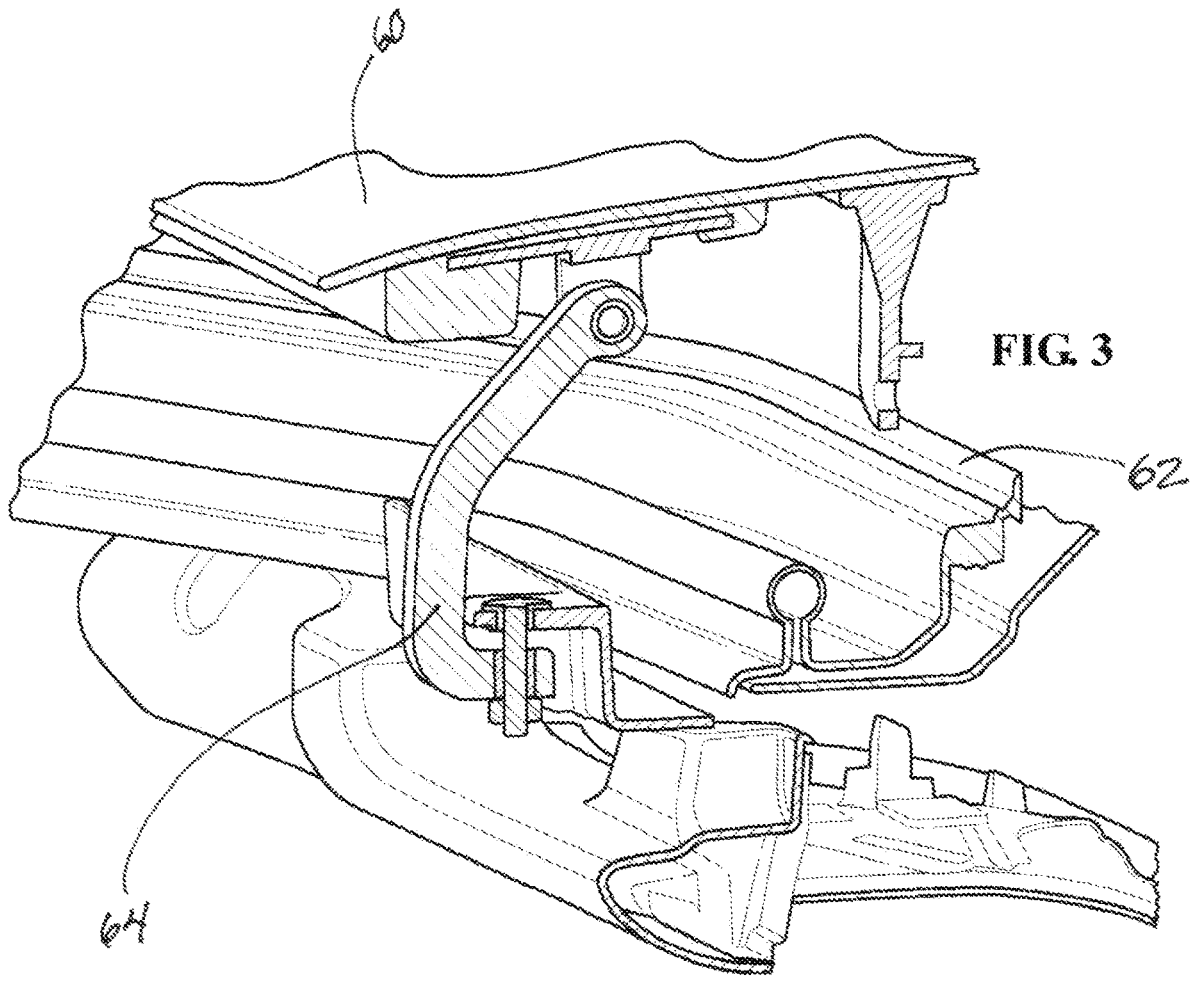
FIG. 3 is a perspective view of one aspect of a handle for operating the opening and closing of the hard roof panel.

FIG. 3 provides a cutaway view of handle 64 as it is adhered and secured to hard roof panel 60. Handle 64 is proximate vehicle roof 62 when the retractable hard roof panel assembly is in its most rearward position.

Figure 4:
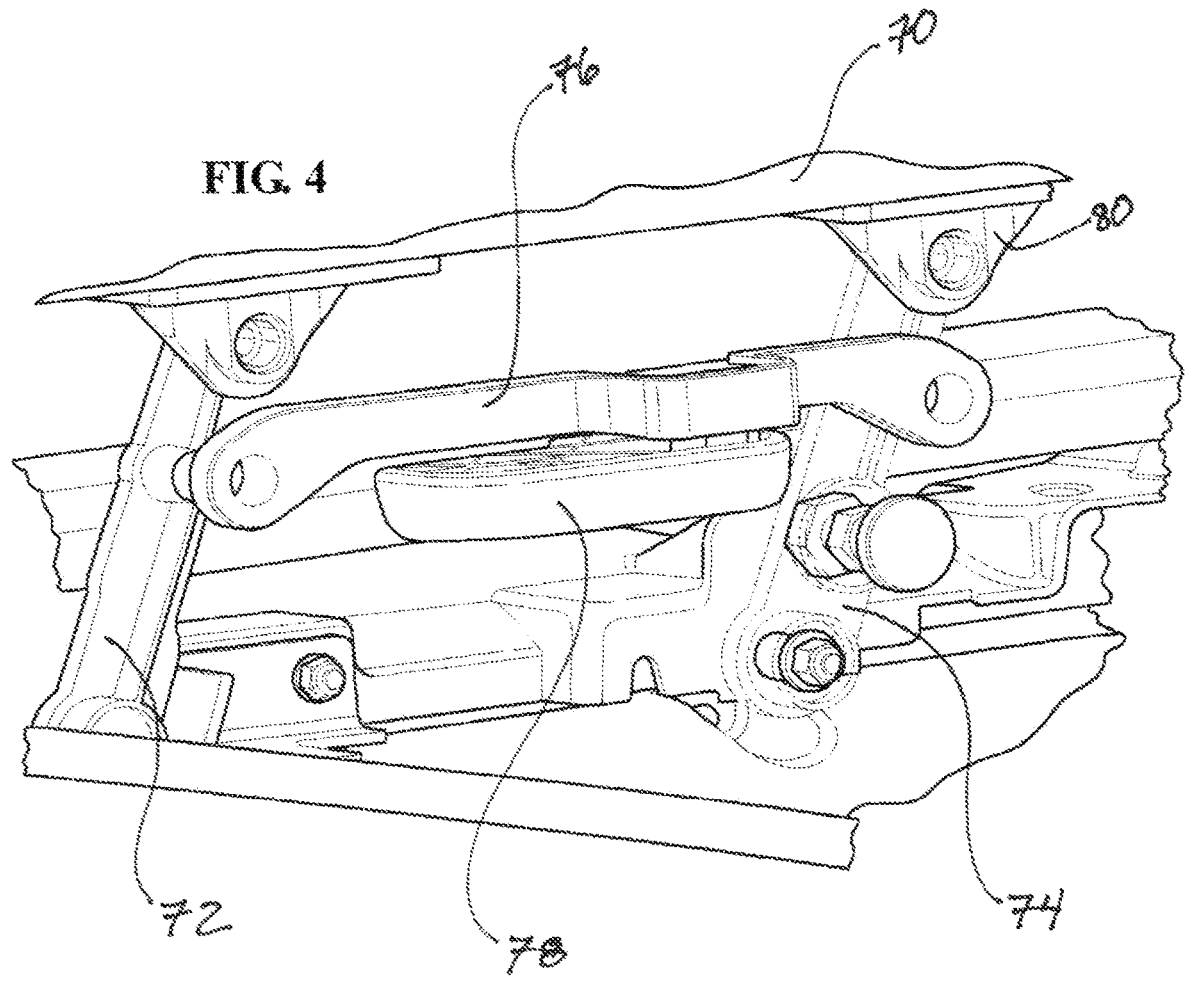
FIG. 4 is a perspective cutaway view of retracting and lifting struts.

FIG. 4 provides greater detail with respect to first and second struts 72 and 74, synchronized by synchronizing connector arm 76. Attachment brackets 80 connect struts 72 and 74 to hard roof panel 70. A release handle 78 acts to maintain the hard roof panel 70 in position.

Figure 5:
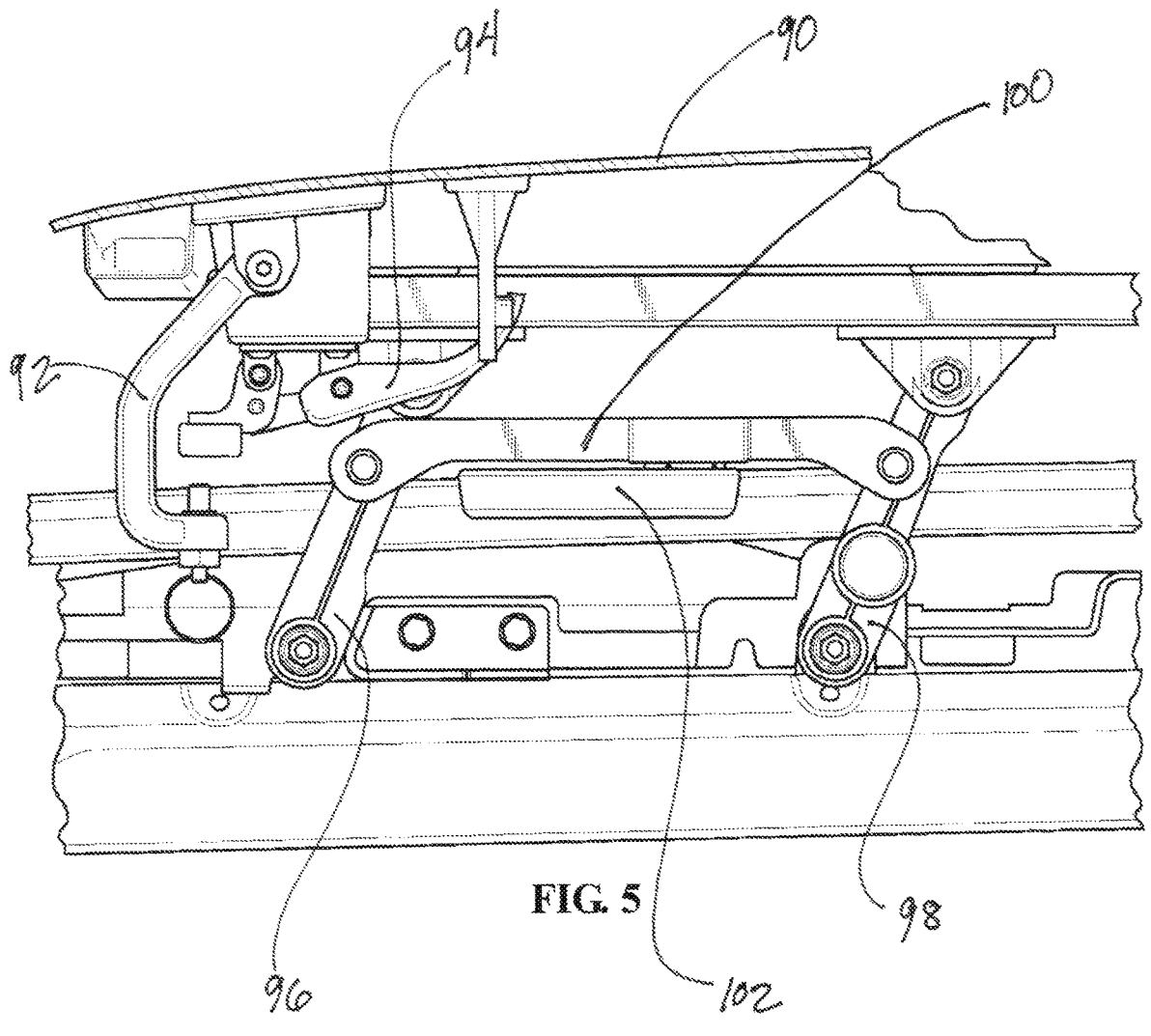
FIG. 5 is a side elevational view of the lifting struts.

FIG. 5 is a side elevational view of hard roof panel 90 in a retracted position secured by lock latch 94. First and second struts 96 and 98, respectively, are synchronized by connecting arm 100 and locked in place by lock latch 102.

Figures 6A, 6B:
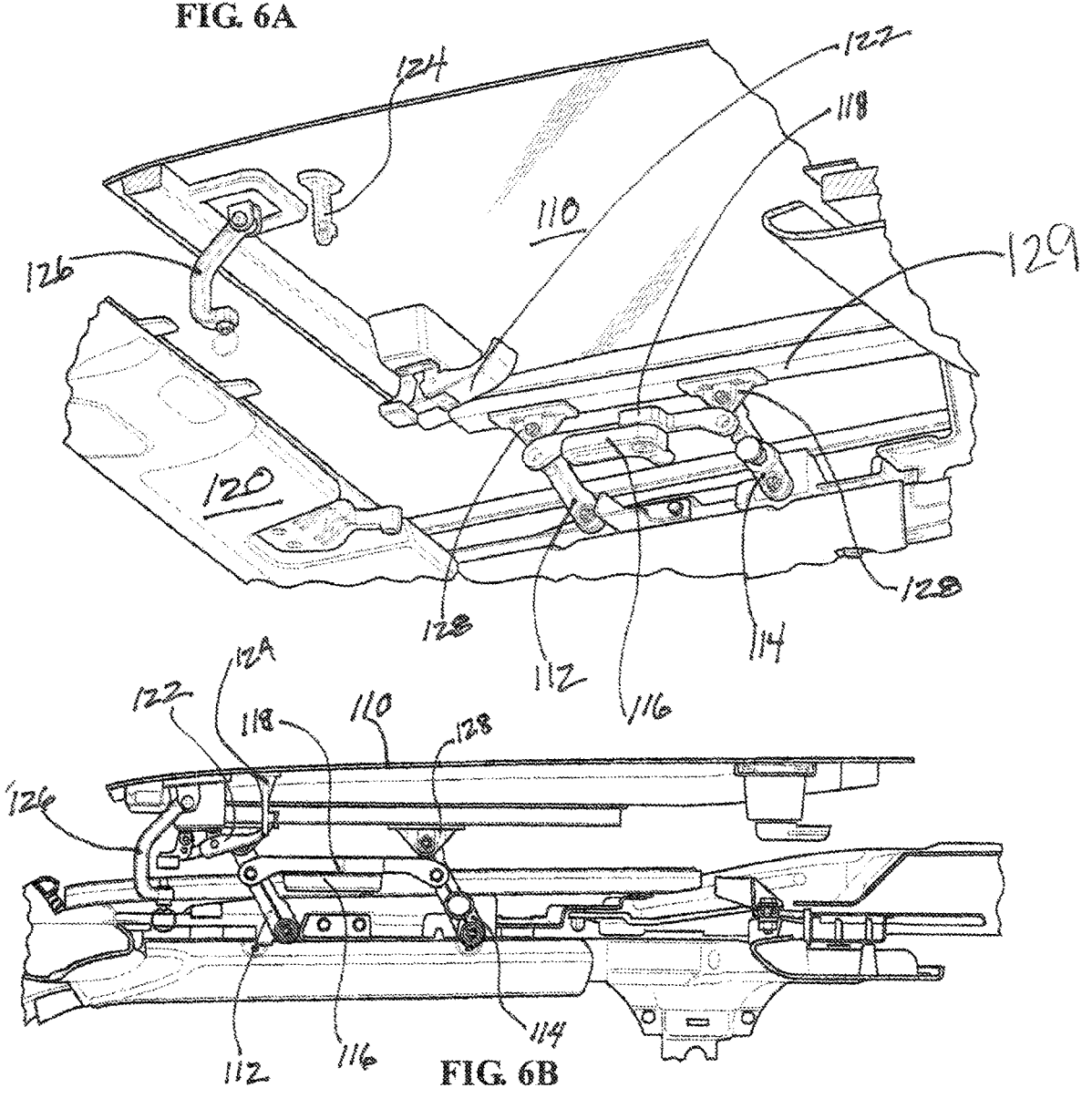
FIG. 6A is a perspective view of the underside.
FIG. 6B is a side elevational view of the lifting struts.

FIGS. 6A and 6B are respectively, a perspective view and a side elevational view, of a preferred aspect of the present invention. Collective references are made to like element numbers for clarity. Hard roof panel 110 includes first and second struts 112 and 114, respectively, which are synchronously connected by connector arm 118, capable of being locked in place by hockey stick shaped handle latch 116. Attachment brackets 128 connect first and second struts 112 at 114 to hard roof panel 110. Vehicle structure 120 supports hard to panel 110 when it is in a closed position, and secured to vehicle structure 120 by lock latch 122. Receiving post 124 secures handle 126 when handle 126 is swung upwardly and attached to receiving post 124, either by press fitting or by a magnetic connection. As such, handle 126 is pivotally connected to hard panel 110, preferably by an adhesive, or by attachment to a header which is part of an encapsulating member surrounding the periphery of hard roof panel 110.

Figure 7:
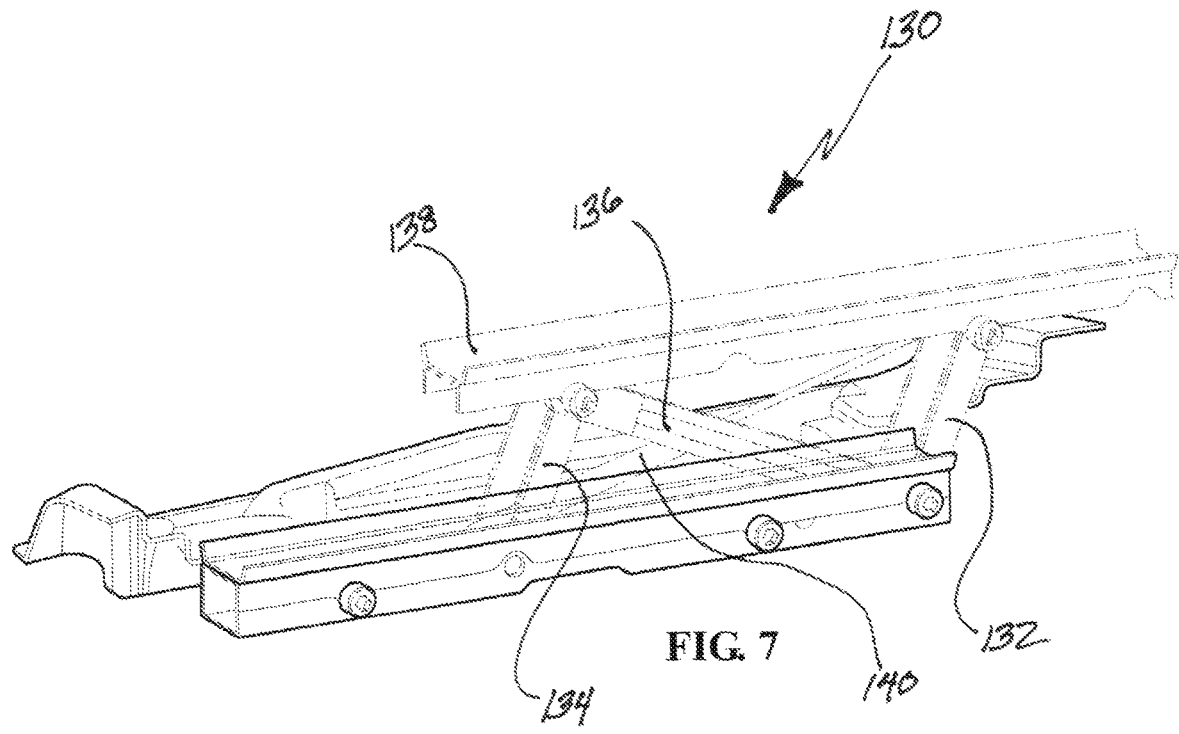
FIG. 7 is a perspective cutaway view of one aspect of the retracting and lifting struts.

FIG. 7 shows another aspect of the present invention, generally denoted by numeral 130, wherein front and rear struts, 132 and 134, respectively are supported by cross strut 136. Hydraulic strut 140 assists the lifting operation for slide support rail 138, which receives hard roof panels as described more fully hereinabove. This aspect is shown in phantom to indicate relative movement by struts 132 and 134 placing a hard roof panel into position.

Figure 8A:
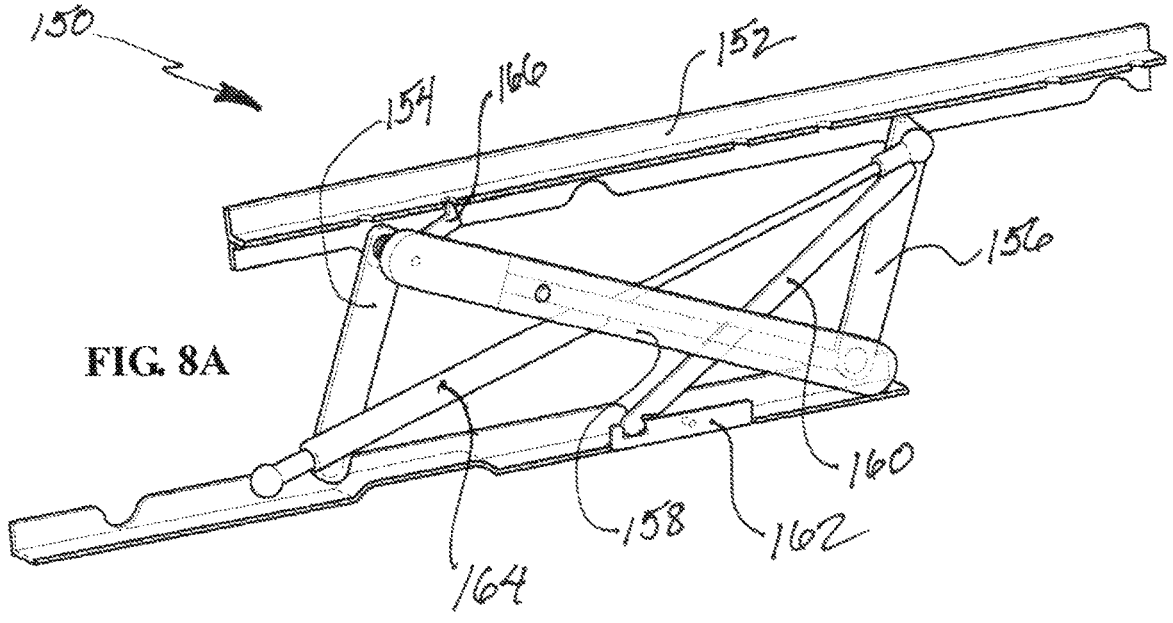
FIG. 8A is a perspective view of another aspect of retracting and lifting struts in an open position.
Figure 8B:
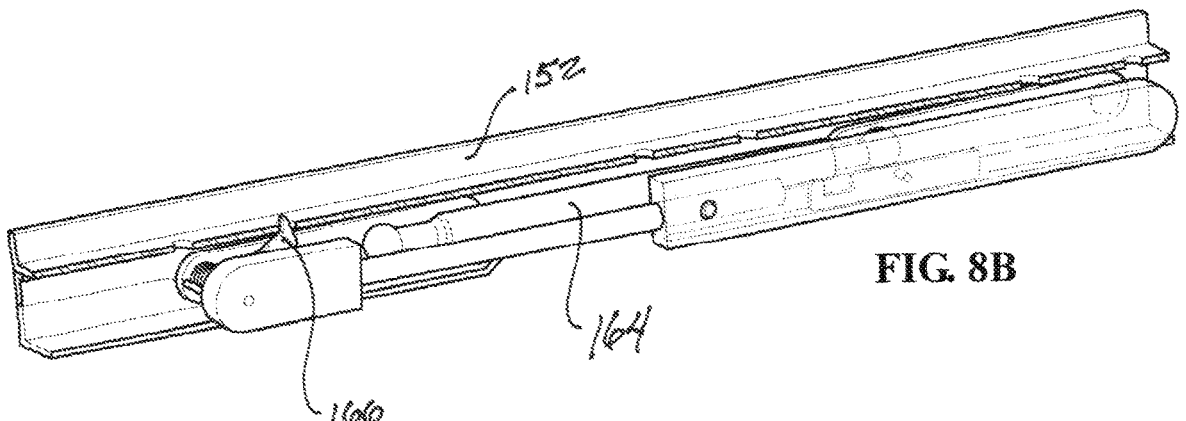
FIG. 8B is a perspective view of another aspect of retracting and lifting struts in a closed position.

FIGS. 8A and 8B show first and second struts 154 and 156 supported by cross arm 158 in a lifted position. Lifting is assisted by hydraulic struts 164. In this aspect, a locking arm 160 is received by lock plate 162, while a positioning slide lock latch 166, which is tensioned by a spring (not shown), is adapted to secure slide support rail 152 in various positions due to a multitude of position indents. In operation, locking arm 160 is urged upwardly, allowing positioning slide lock latch 166 to be moved away from the indents by the attached spring. Support rail 152, which receives hard roof panels as described more fully hereinabove is thereby retracted and locked in place. FIG. 8B shows relative placement of the hydraulic strut 164, the positioning lock 166, and the support rail 152 in the closed position.

Figure 9A:
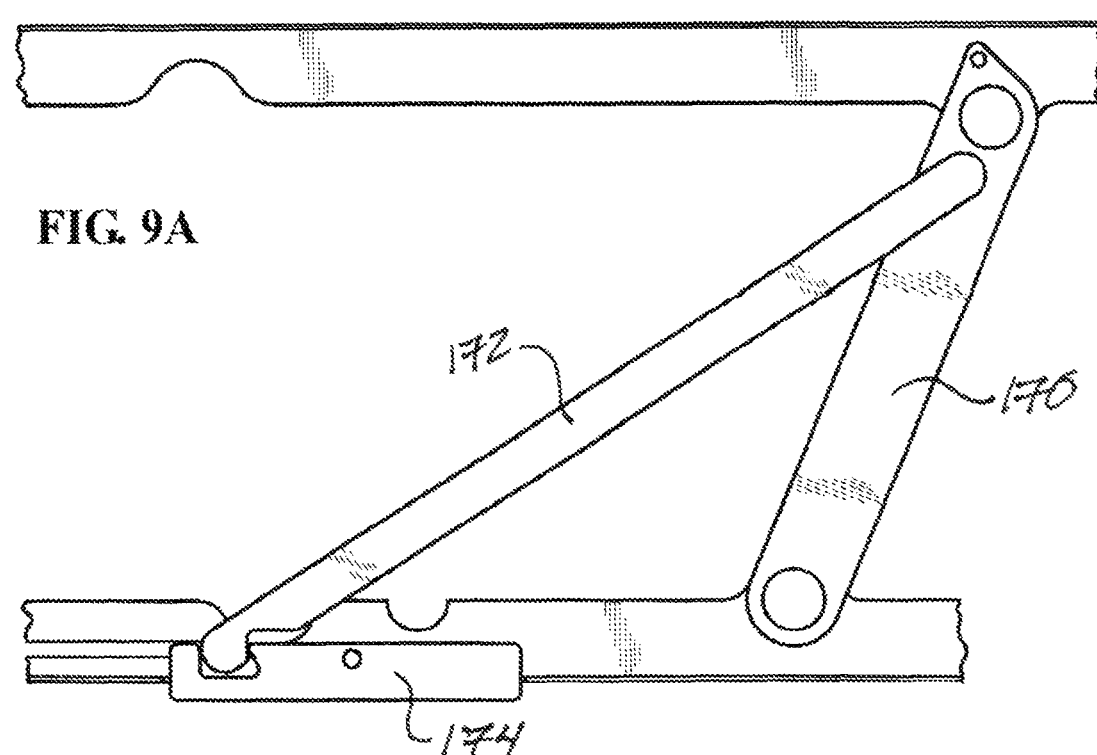
FIG. 9A is a side elevational view of a locking mechanism.
Figure 9B:
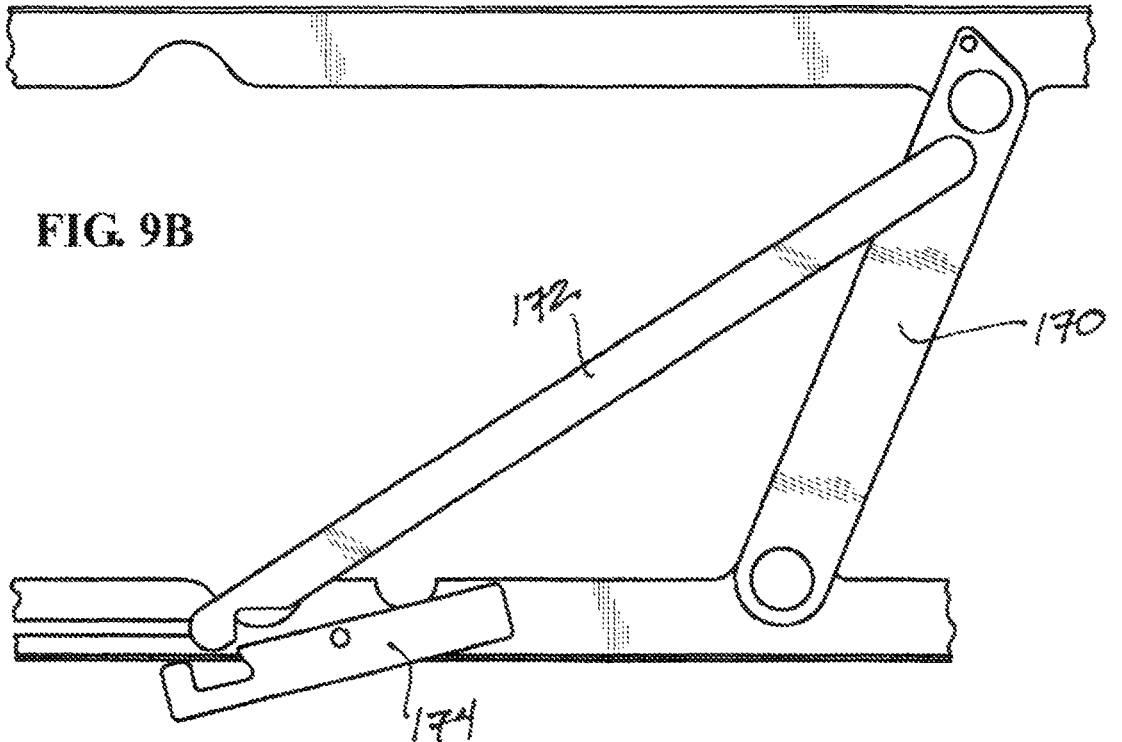
FIG. 9B is a side elevational view of the locking mechanism in an unlocked position.

FIGS. 9A-9B Illustrate simplified views of a strut 170 with a locking arm 172 engaged in locking plate 174, both in an engaged position and a disengaged position. This mechanism becomes integral in the retractable hard roof panel assembly.

Figures 10A, 10B, 10C:
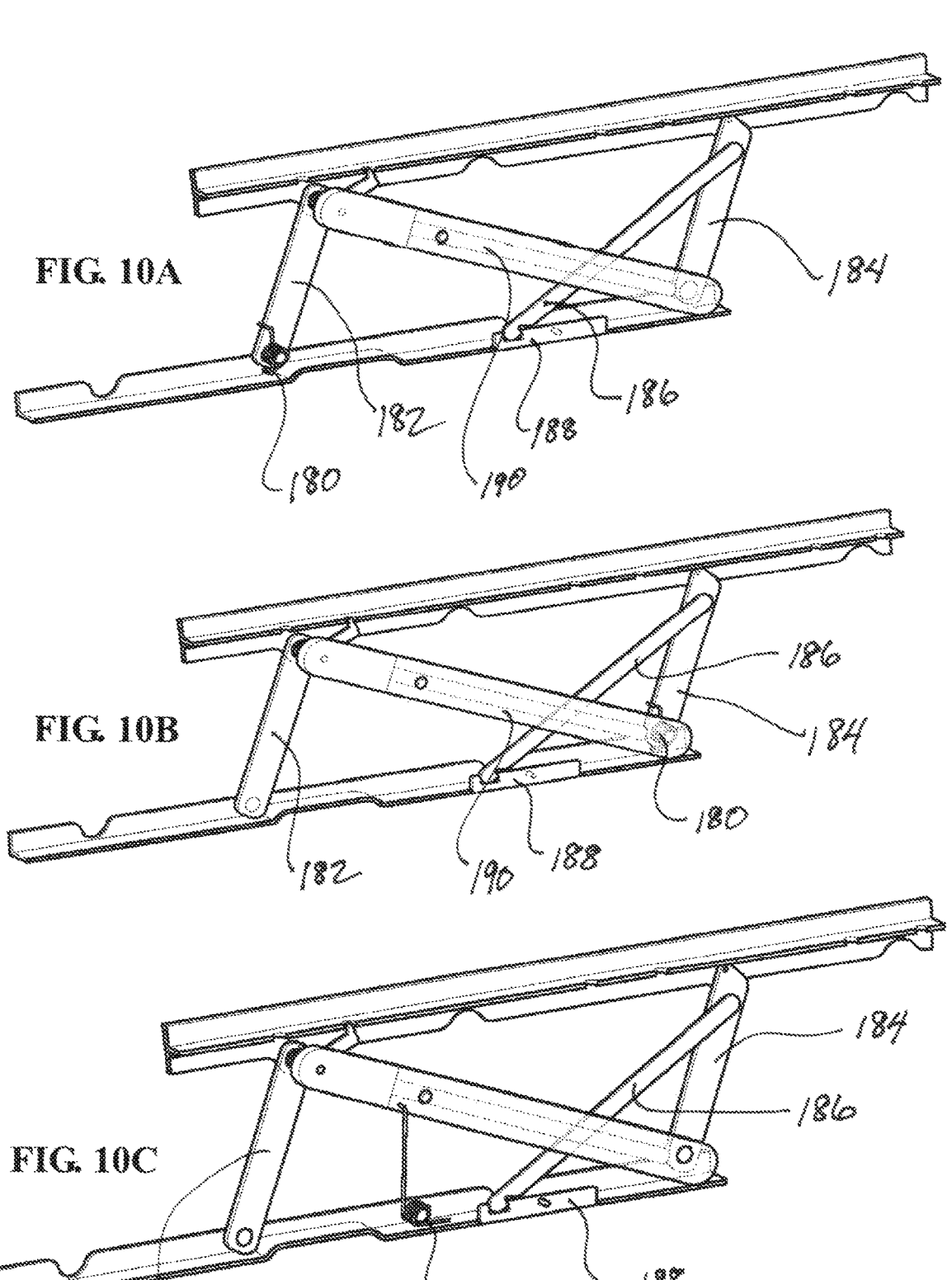
FIG. 10A is a perspective view of another aspect of retracting and lifting struts with a torsion spring in an open position.
FIG. 10B is a perspective view of another aspect of retracting and lifting struts with a variant torsion spring in an open position.
FIG. 10C is a perspective view of another aspect of retracting and lifting struts with yet a different type of torsion spring in an open position.

FIGS. 10A-10C illustrates various aspects and positions possible for tension spring 180 in various locations with respect to front and rear struts, 182 and 184, respectively. Again, cross arm support 190 is diagonally attached to first and second struts 182 and 184, while positioning slide lock latch 186 is engaged in lock plate 188. Spring 180 is attached to the bottom of front strut 182 in FIG. 10A, while spring 180 is attached to the bottom of rear strut 184 in FIG. 10B and elongated torsion spring 180 is attached to the cross arm 190 in FIG. 10C. Torsion spring 180 aids in assisting the position of first and second struts 182 and 184.

Figure 11A:
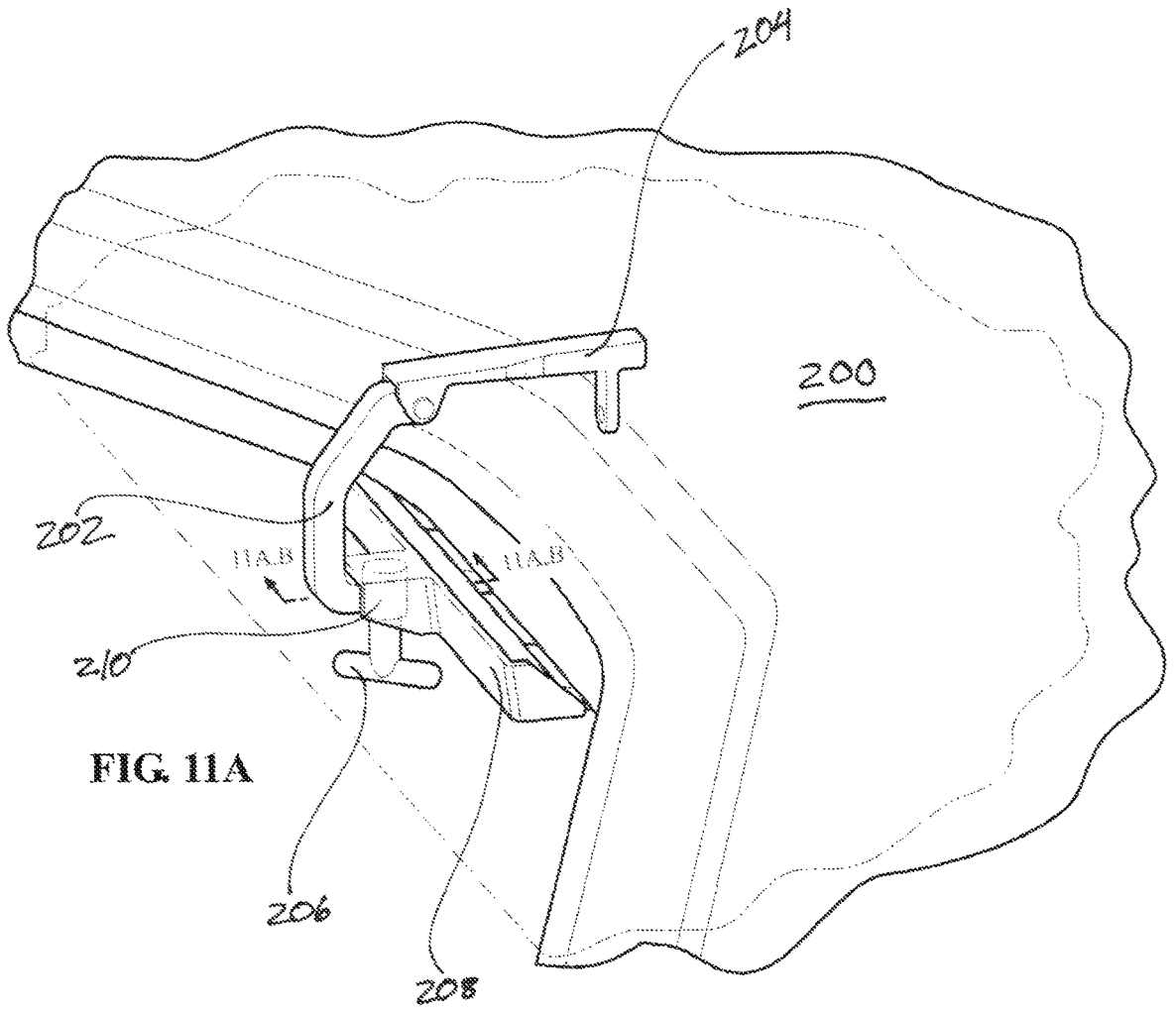
FIG. 11A is a perspective view of a retracting handle.
Figure 11B:
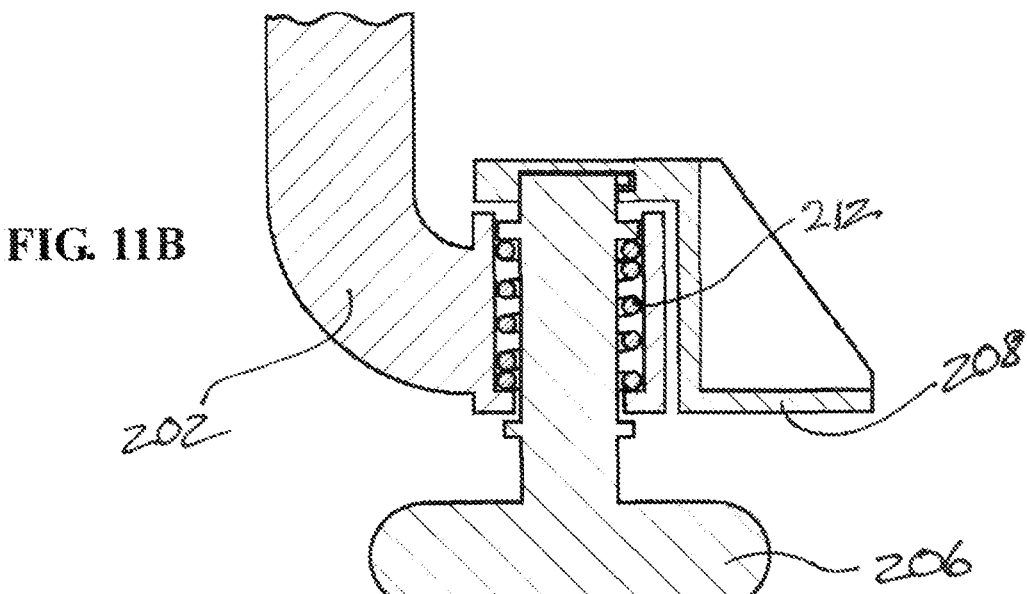
FIG. 11B is a cross sectional view of a spring plunger.
Figure 11C:
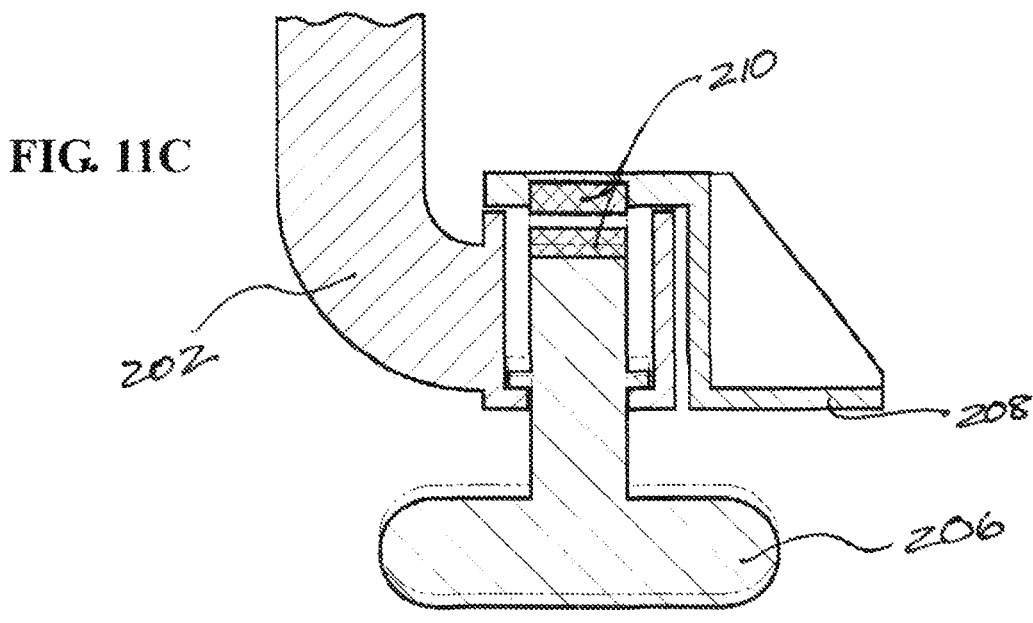
FIG. 11C is a cross sectional view of a magnet plunger.

FIGS. 11A-11C show various aspects of the present invention wherein retraction handle 202 is pivotally connected to and secured underneath hard roof panel 200 by T-shaped plunger 206 including a magnetic connection. Various aspects of pull handle 208 are shown in a cross-sectional description in FIGS. 11B and 11C. FIG. 11B includes an aspect with a positioning spring 212 contained within handle body 202. T-shaped pin 206 is urged into position and may be twisted for securement. FIG. 11C includes a illustration of a magnetic configuration with magnets 210, which when turned, disengages magnets 210 for release and securement.

Figure 12:
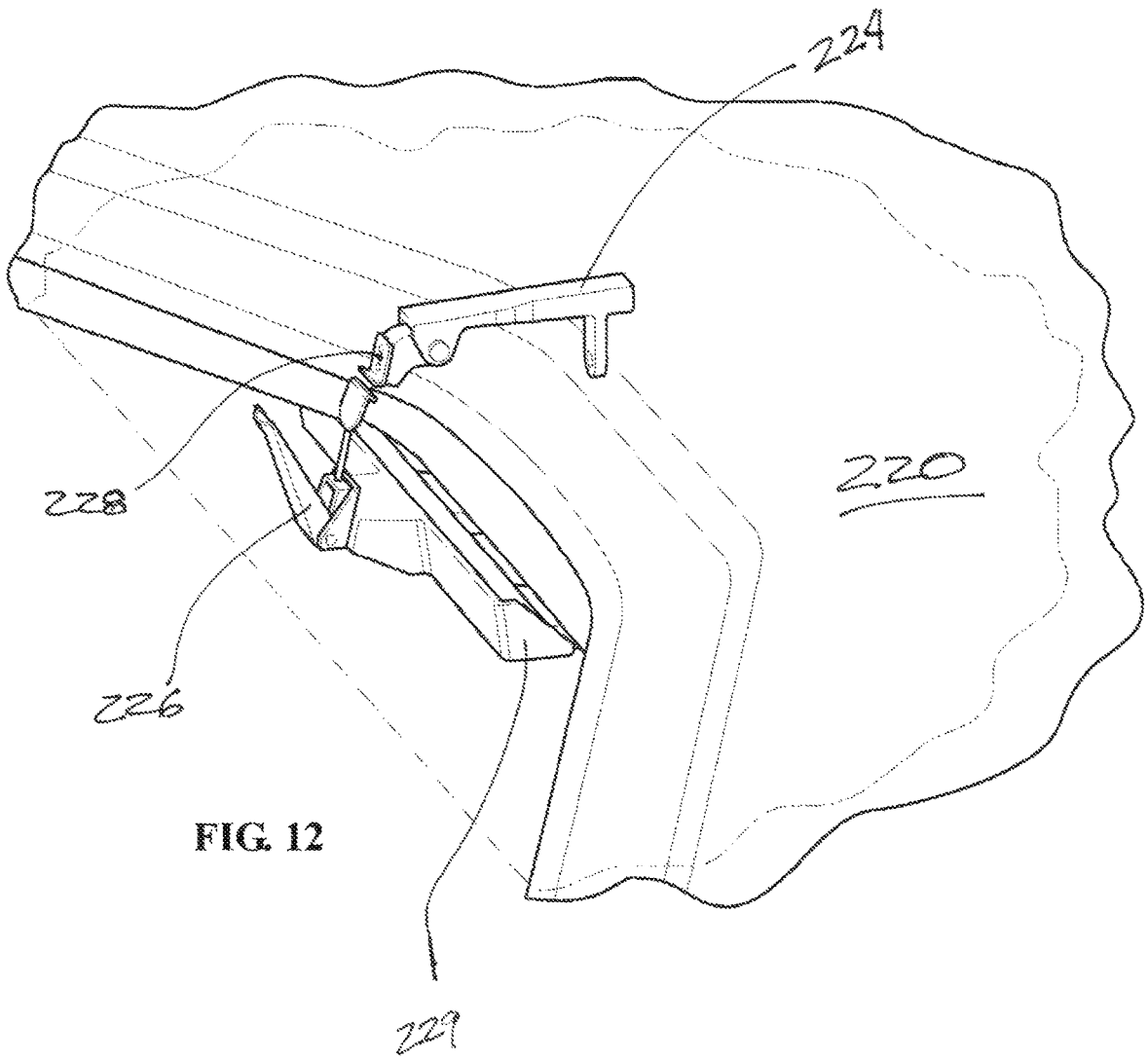
FIG. 12 shows a compression hook latch.

FIG. 12 is yet another aspect of the present invention with a compression latch 226 engageable with compression latch hook 228 pivotally connected to hard roof panel attachment member 224. Hard roof panel attachment member 224 is secured to hard roof panel 220. Compression latch 226 secures hard roof panel 220 to pull handle 229.

Figure 13:
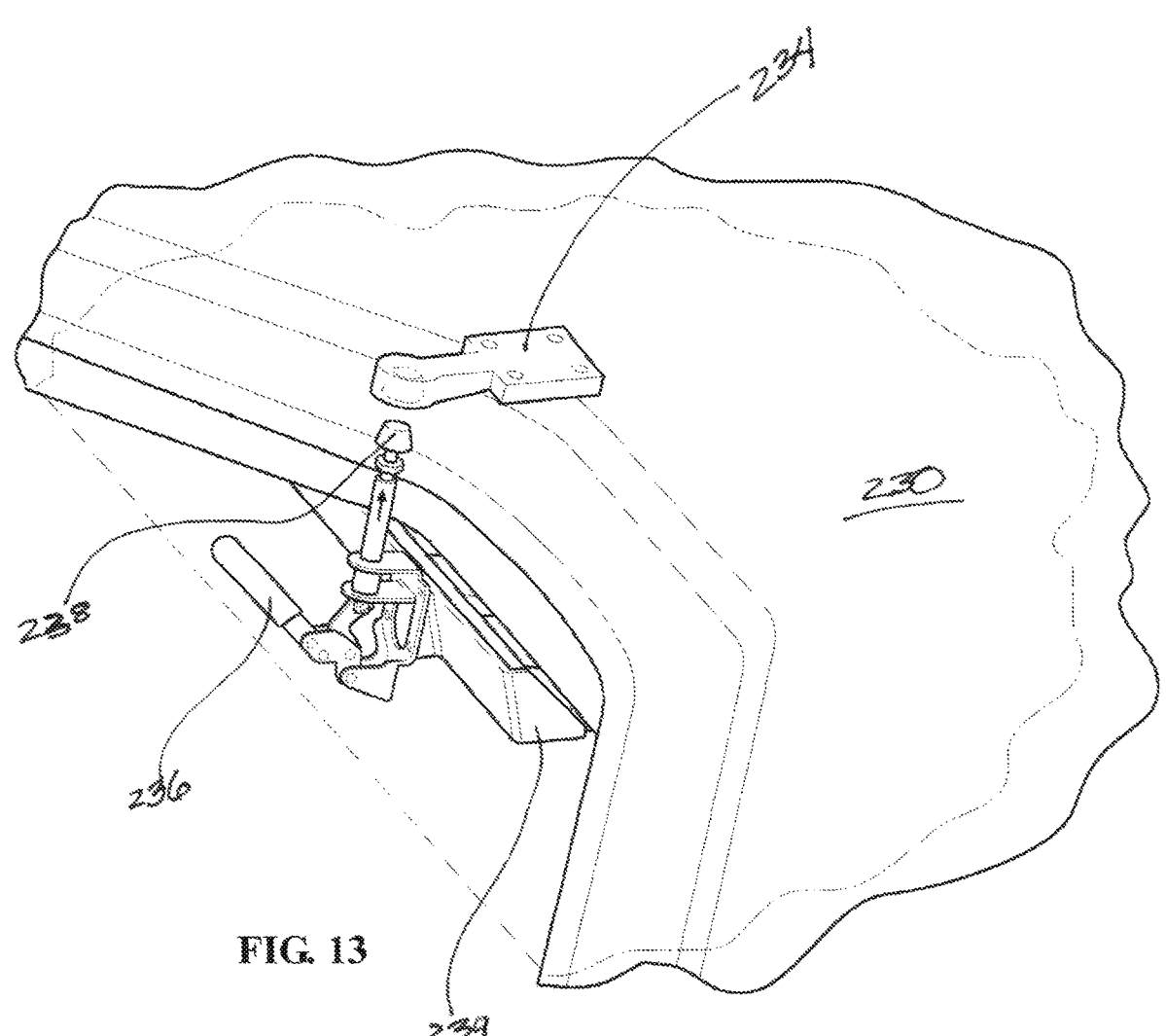
FIG. 13 illustrates a toggle clamp latch configuration.

FIG. 13 is still another aspect of the present invention with a toggle clamp 236 utilizing a plunger 238 to secure hard roof panel attachment member 234, thereby securing hard roof panel 230 in place. Pull handle 239 is operable by the occupant in the cabin interior of the vehicle.

Figure 14:
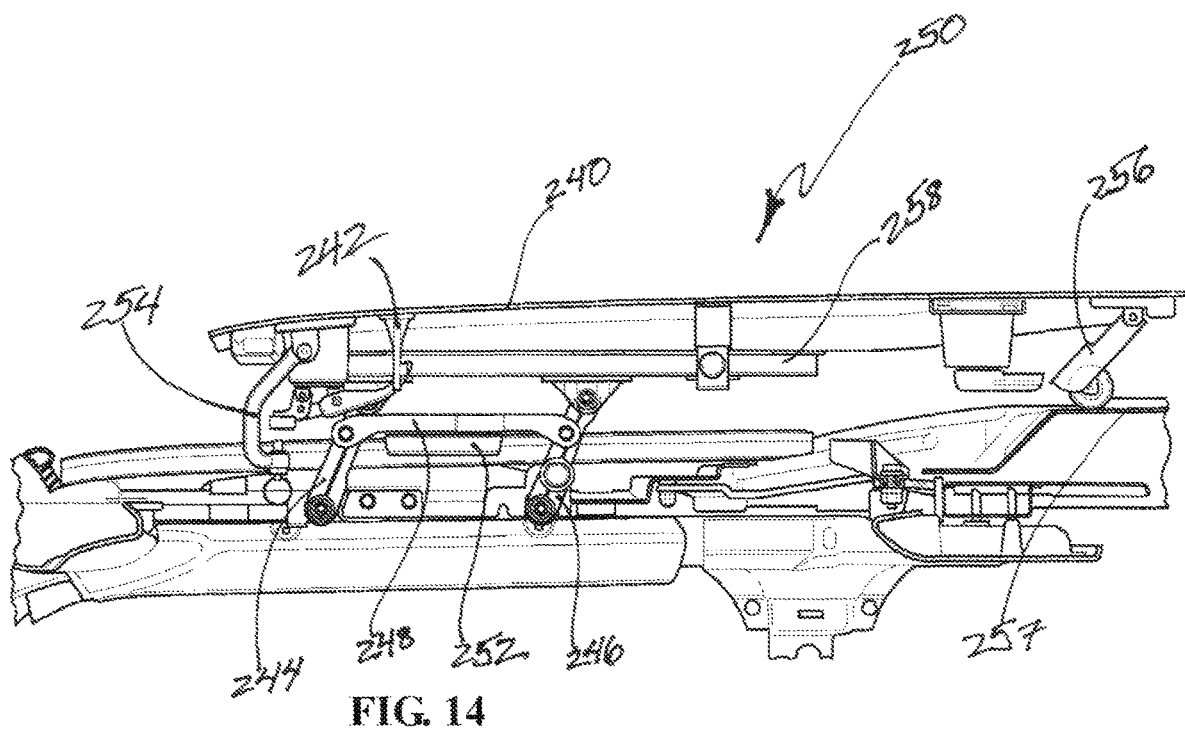
FIG. 14 details a shock absorbing spring roller.

FIG. 14 is yet still another aspect of the present invention generally denoted by the numeral 250, including a shock absorbing guide wheel 256 that rides on top of vehicle roof 257 to prevent damage while driving the vehicle. Hard roof panel 240 is secured to support rail 258 and retractable by first and second struts 244 and 246, respectively. Synchronizing connector arm 248 is also secured by latch handle 252. Handle 254 is secured to the underside of hard roof panel 240. Shown in the retracted position, Securement post 242 also secures a lock latch.

Figures 15A, 15B:
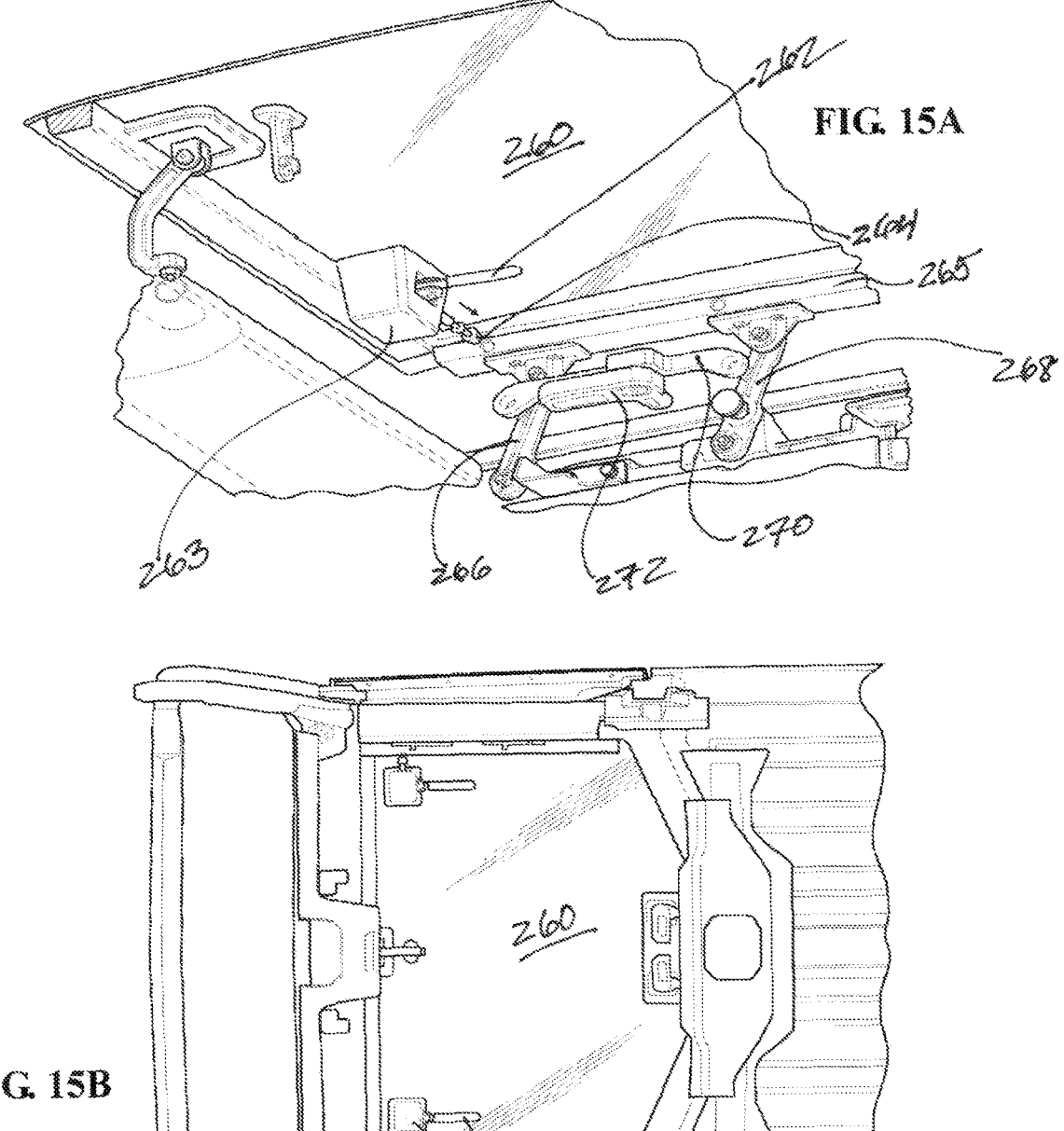
FIG. 15A shows a toggle clamp latch.
FIG. 15B is a bottom plan view of the aspect of FIG. 15A.

Looking next to FIGS. 15A and 15B, two views of a toggle clamp latch 262 is held within latch housing 263, which is in turn, secured to the underside of hard roof panel 260. As toggle clamp latch 262 is activated, plunger 264 extends into a detente in the adjoining sliding rail 265 to secure and compress a seal to the side of the vehicle, thereby preventing rattles and wind noise while driving.

Figures 16A, 16B:
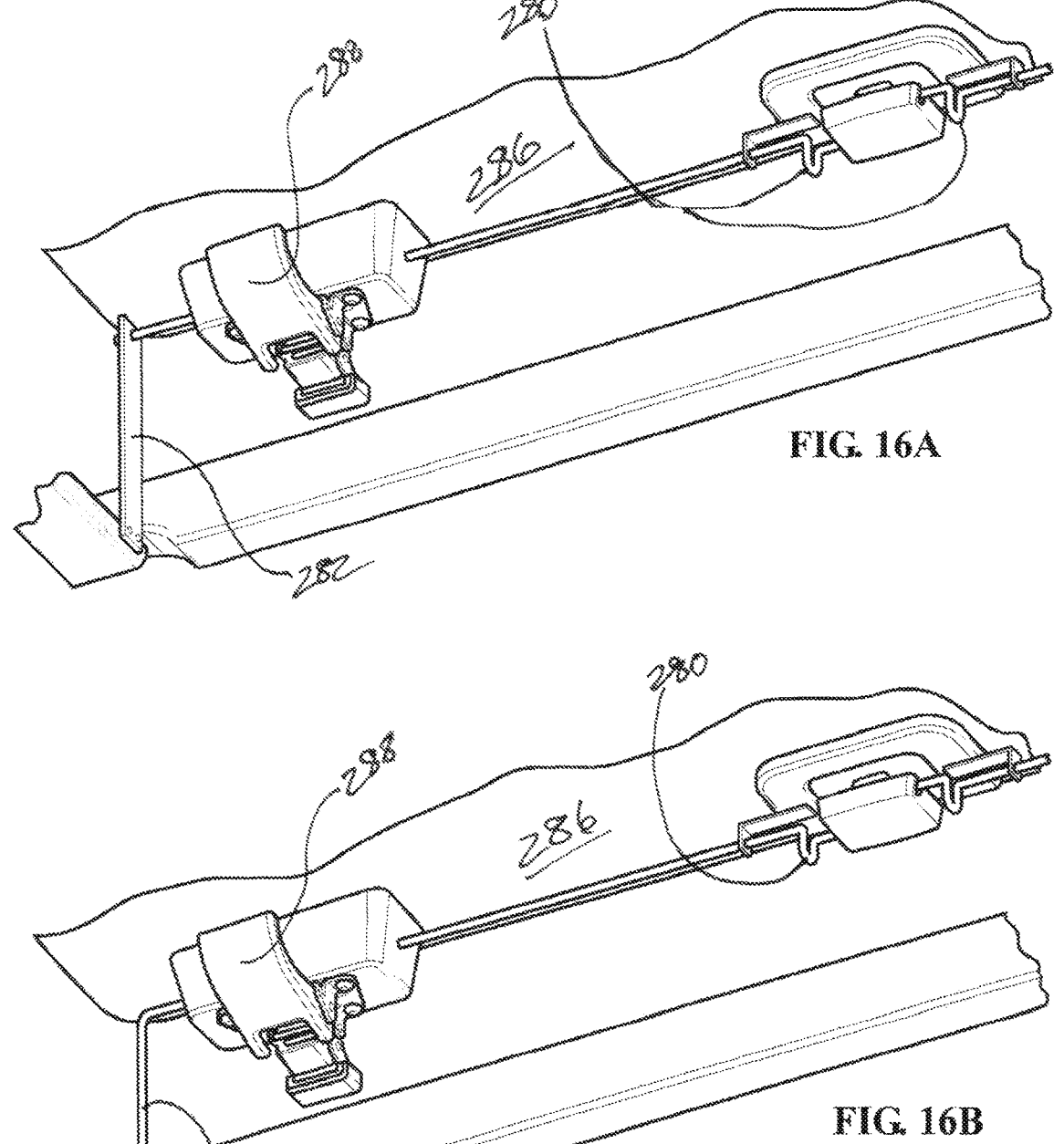
FIG. 16A is a bottom perspective view of another aspect of a squeeze release.
FIG. 16B is a bottom perspective view of another aspect of a squeeze release.
Figure 16C:
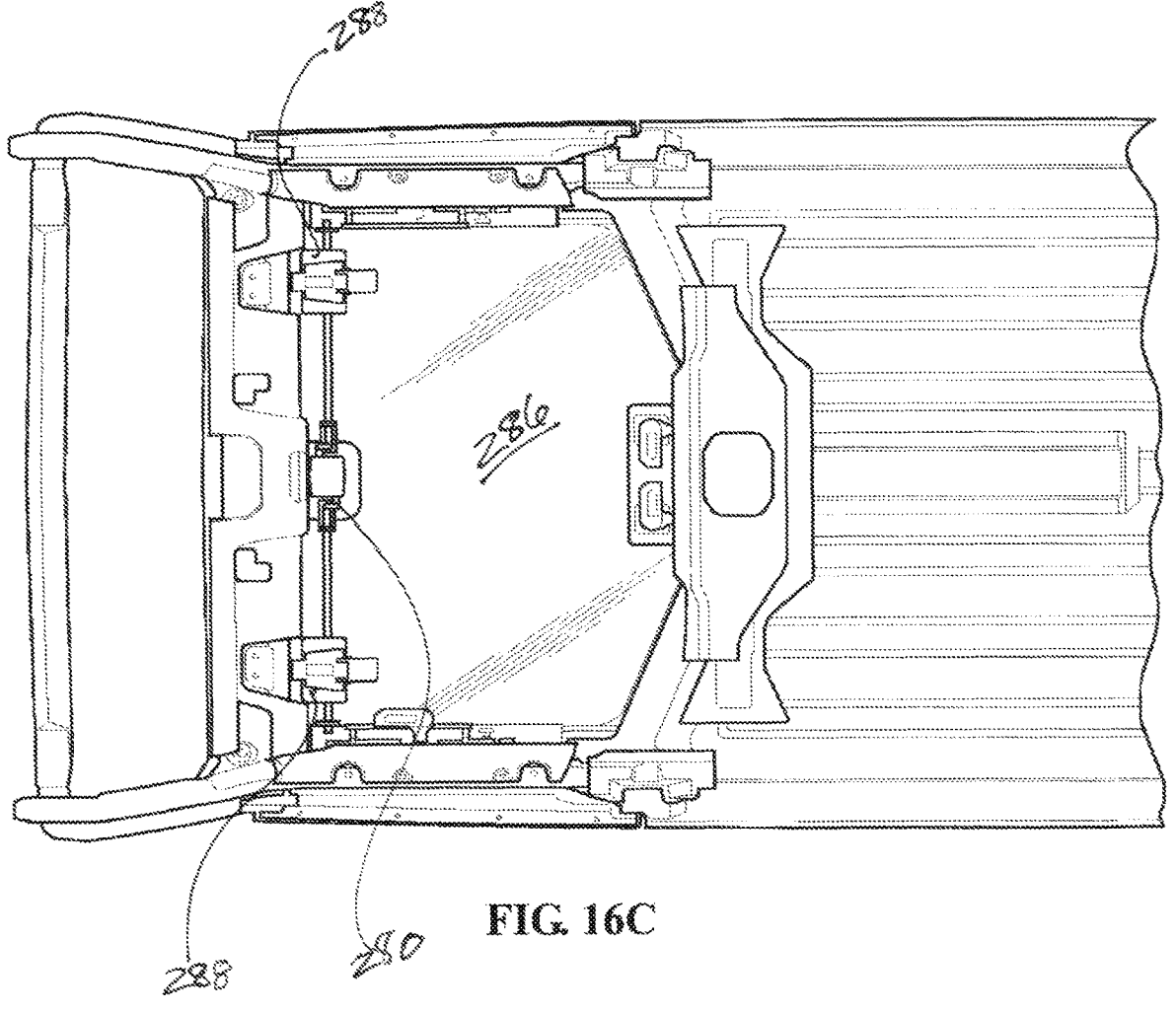

FIGS. 16A and 16B show yet two variations of an aspect for securement of hard roof panel 286 by squeezably releasing a release bar 280 from a plate 282, or in the alternative, an elongated release bar 284 of FIG. 16B. Latch 288 is secured to hard roof panel 286. FIG. 16C is a bottom plan view of the relative placement of latches 288 and squeeze release 280.

FIGS. 17A and 17B include a T-shaped latch 290 as still another aspect for applying compression pressure to effect a seal against outer elements. T-shaped latches 290 are permanently affixed to support rail 296, and include T-shaped handles 292 adapted to be received by latch key 294. Once T-shaped handle 292 is in place, pressure is exerted by compression to provide a tight seal.

Figure 18A:
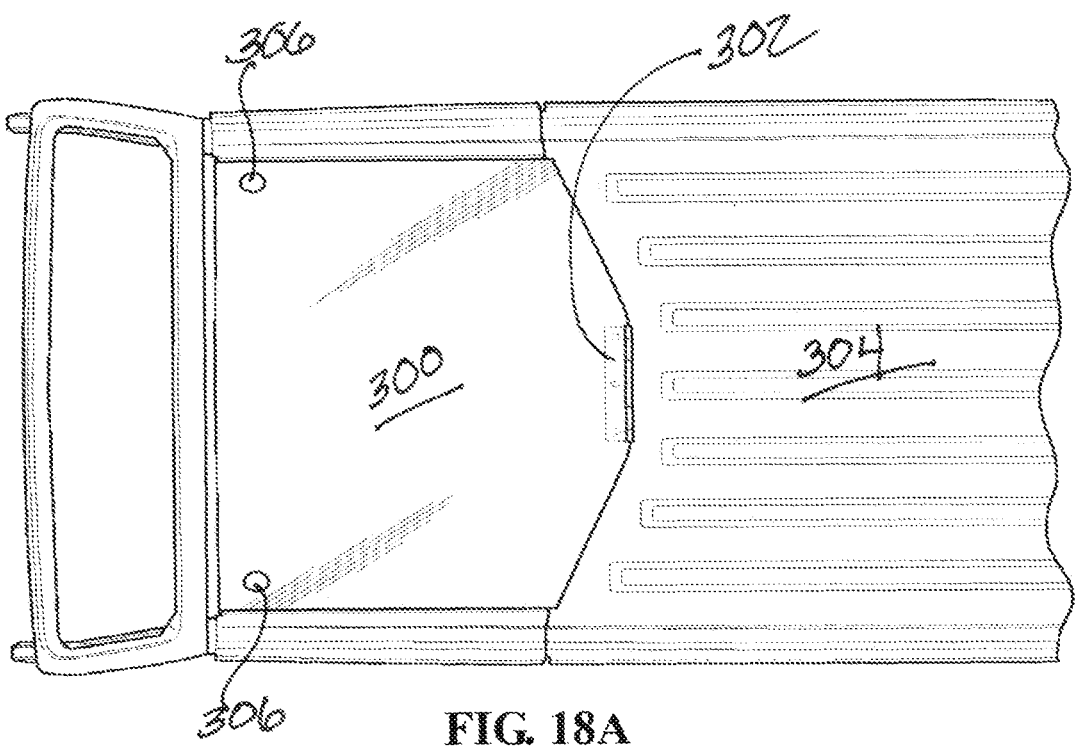
FIG. 18A is a top plan view of another aspect of a folding hard roof panel in a closed position.
Figure 18B:
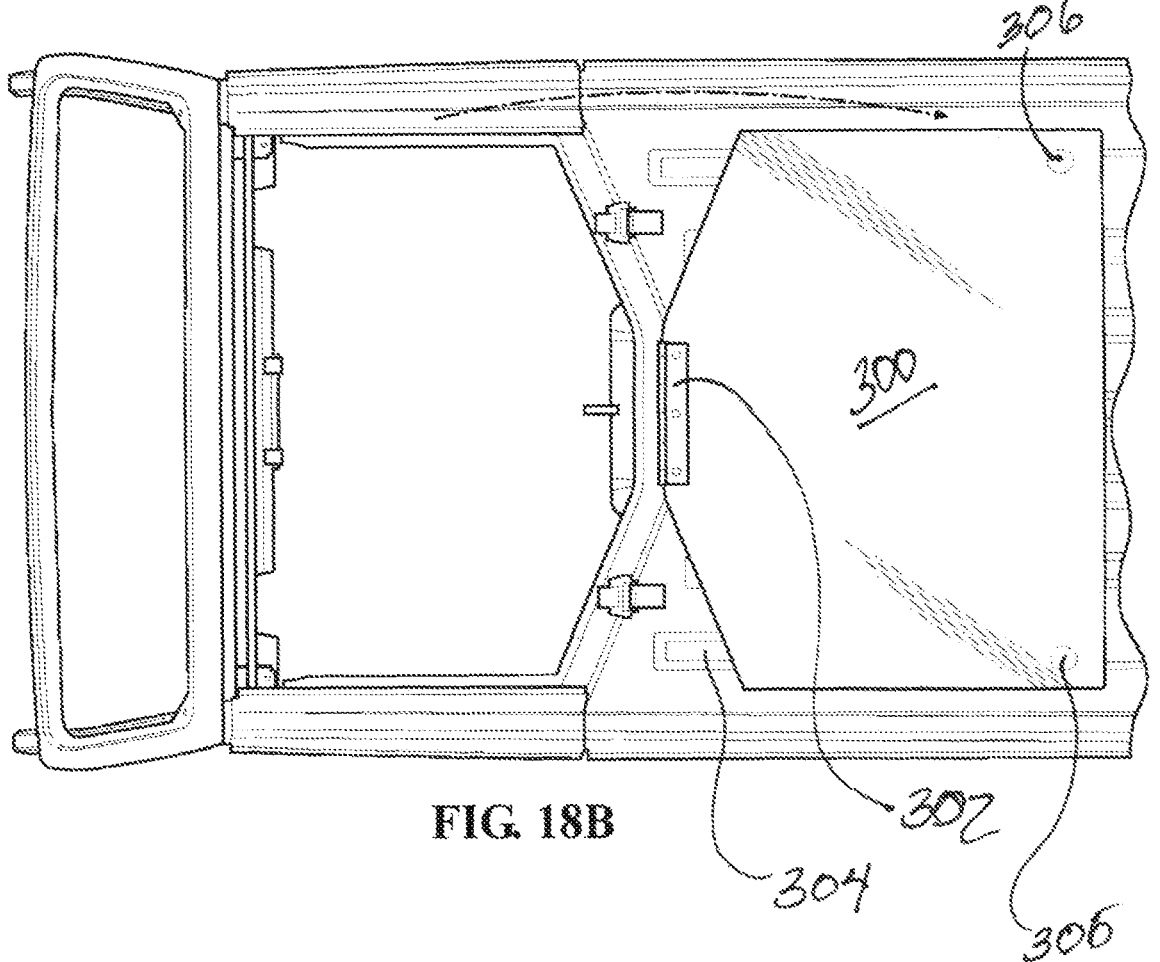
FIG. 18B is a top plan view of another aspect of a folding hard roof panel in an open position.

FIGS. 18A and 18B illustrate another aspect of the hard roof panel configuration with a hard roof panel 300 pivotally mounted permanently to vehicle roof 304. Anti-rattle components 306 may have several possibilities, including magnets or elastomeric bumpers. When the hard roof panel 300 is folded back on top of vehicle roof 304, anti-rattle components 306 provide protection both to vehicle roof 304 and minimize rattle while driving.

Figures 19A, 19B:
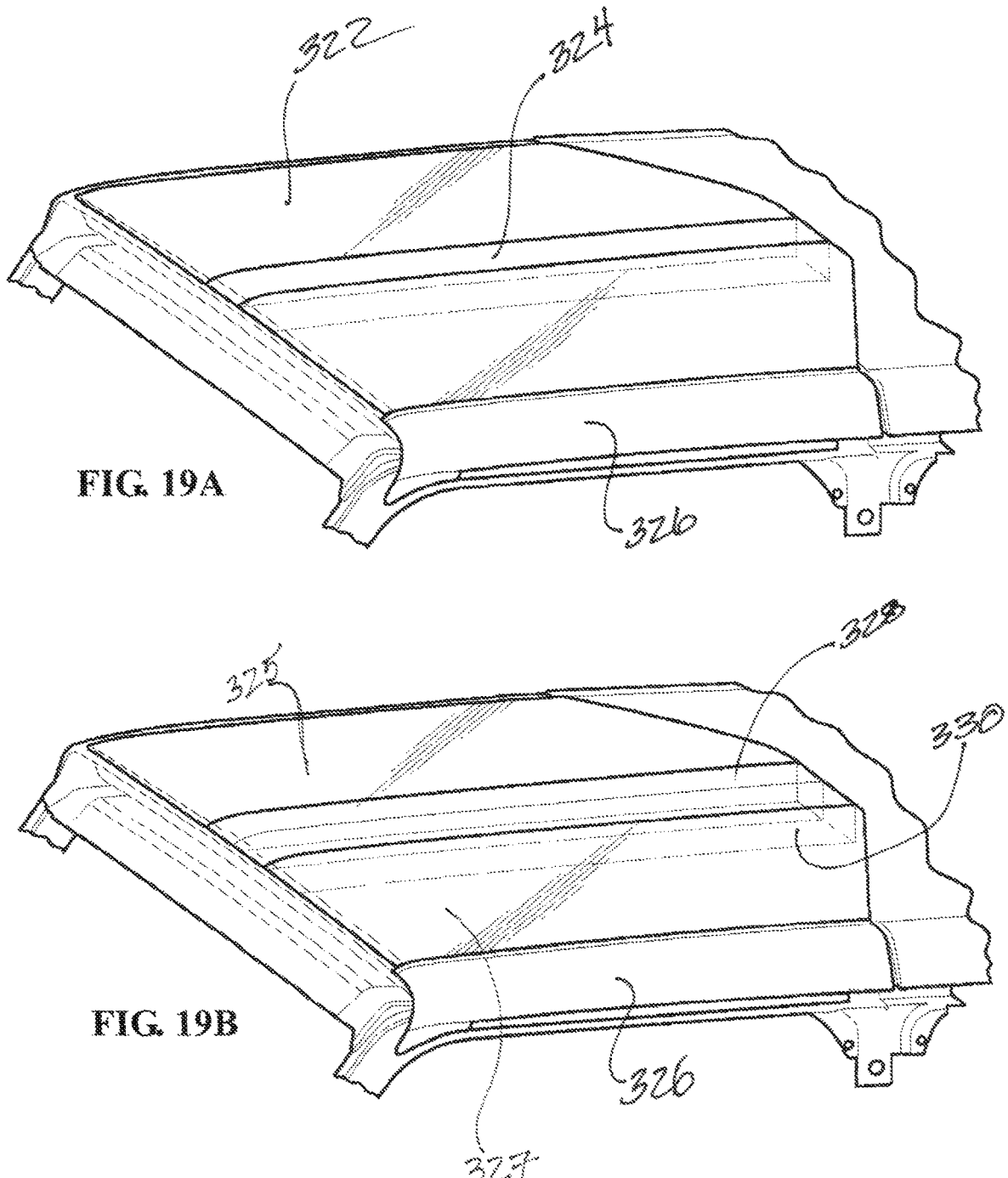
FIG. 19A shows a single center rail retracting system.
FIG. 19B shows a double center rail retracting system.

FIGS. 19A and 19B provide various aspects for support rails, either as a single rail 324 for retracting a single hard roof panel 322, or in the instance of two hard roof panels 325 and 327 in FIG. 19B, a pair of support rails 328 and 330 are to be utilized. A single hard roof panel may be retracted for a total retraction, or, in the alternative, only one half of the cabin interior may be exposed to the outer elements, if so desired.

Figures 20, 21:
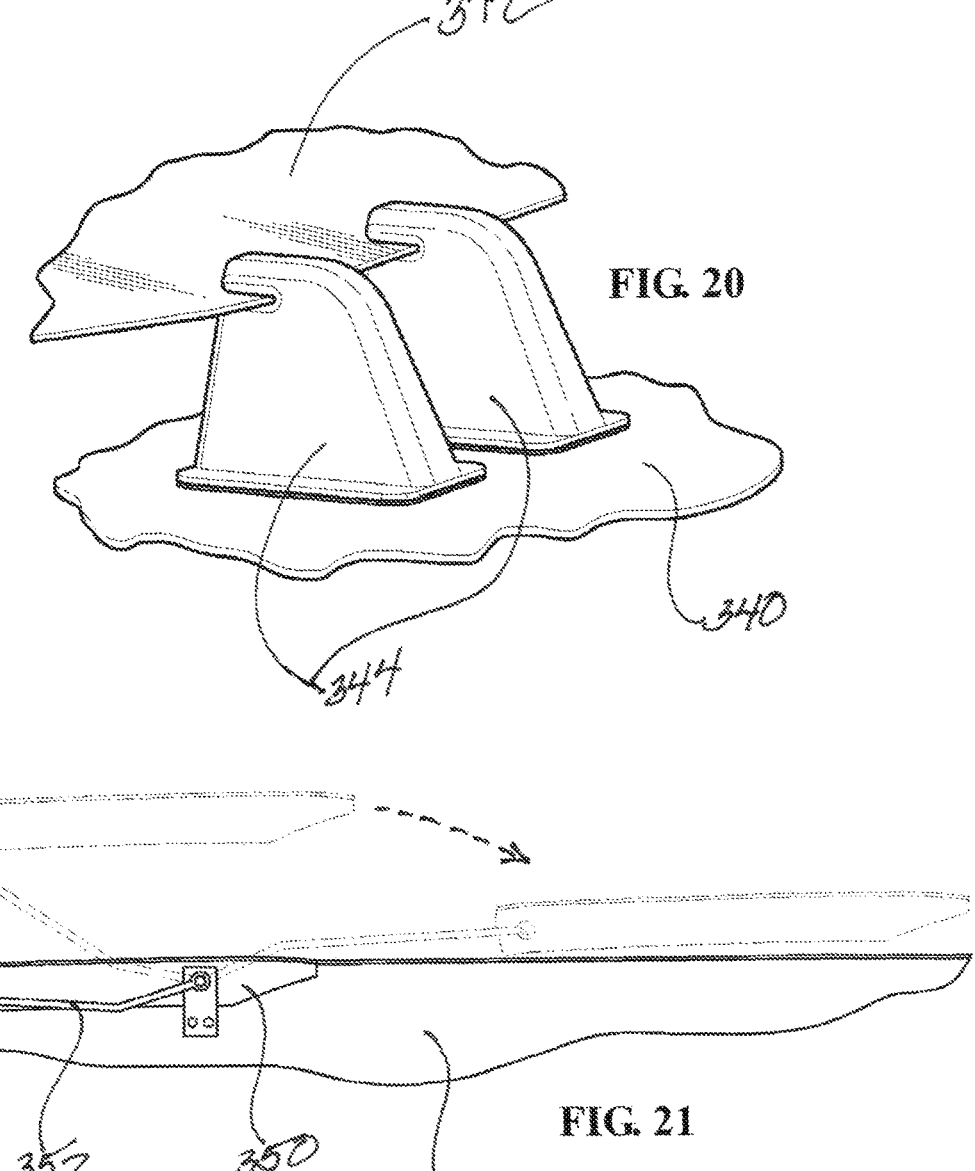
FIG. 20 is a side perspective view of a pair of panel catcher clips.
FIG. 21 is a side elevational view of another aspect of the present invention with a hard roof panel on pivot arms for retraction.

FIG. 20 discloses hard roof panel clips 344 secured to vehicle roof 340 to receive the hard roof panel 342 once retracted. Hard roof panel clips 344 are adapted to add securement to prevent shifting of hard roof panel 342 once retracted.

FIG. 21 illustrates yet another aspect in keeping with the scope of the present invention, wherein a hard roof panel 350 is to be attached on either side by pivot arms 352. Hard roof panel 350 is lifted by pivot arms 352 and laid on top of vehicle roof 354. Securement to vehicle roof 354 may be accomplished in any suitable manner.

Figures 22, 23:
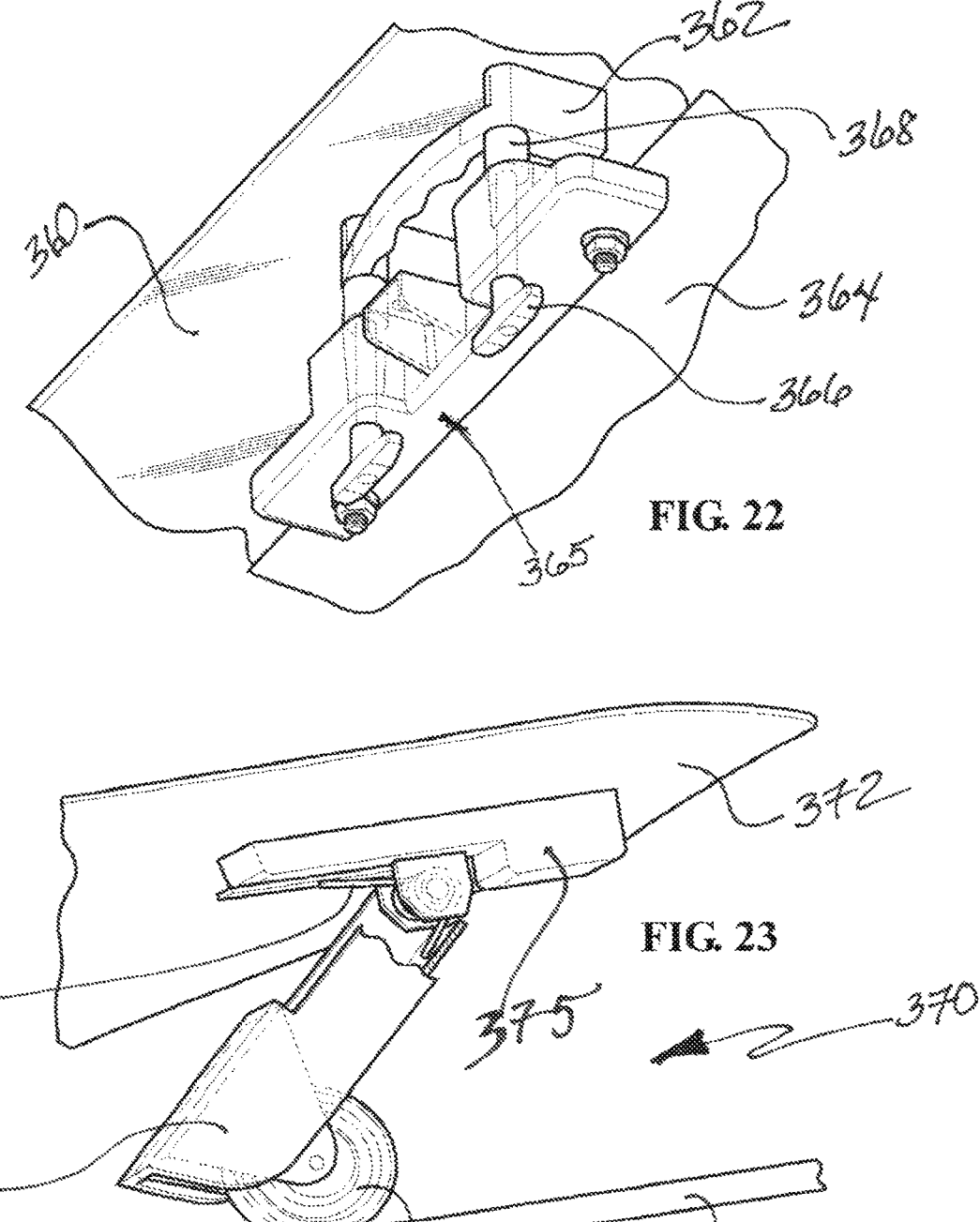
FIG. 22 shows an aspect for the retracting handle with lock from underneath.
FIG. 23 shows a detail of a rolling shock absorber.

FIG. 22 is a close up illustration of yet another aspect of a handle 362 to be used to retract hard roof panel 360. Retracting handle 362 is attached to at least one T-shaped plunger component 366 capable of being received within receiving bracket 368 that is mounted on a pre-existing factory installed plate (not seen in this FIG.). After hard roof panel 360 has been moved to the open, or retracted, position, T-shaped plunger component 366 is urged upwardly through receiving bracket 368 and pressed into place.

FIG. 23 details a shock absorbing spring tensioned roller unit denoted generally by numeral 370, including as roller wheel 374 in a housing arm 376. Spring 378 is connected to an attachment member 375, which is affixed to hard roof panel 372, thereby acting as a spring tensioned roller unit riding on top of vehicle roof 380. As the vehicle moves, roller 374 rides on the vehicle roof top 380, absorbing vibration.

Figure 24A:
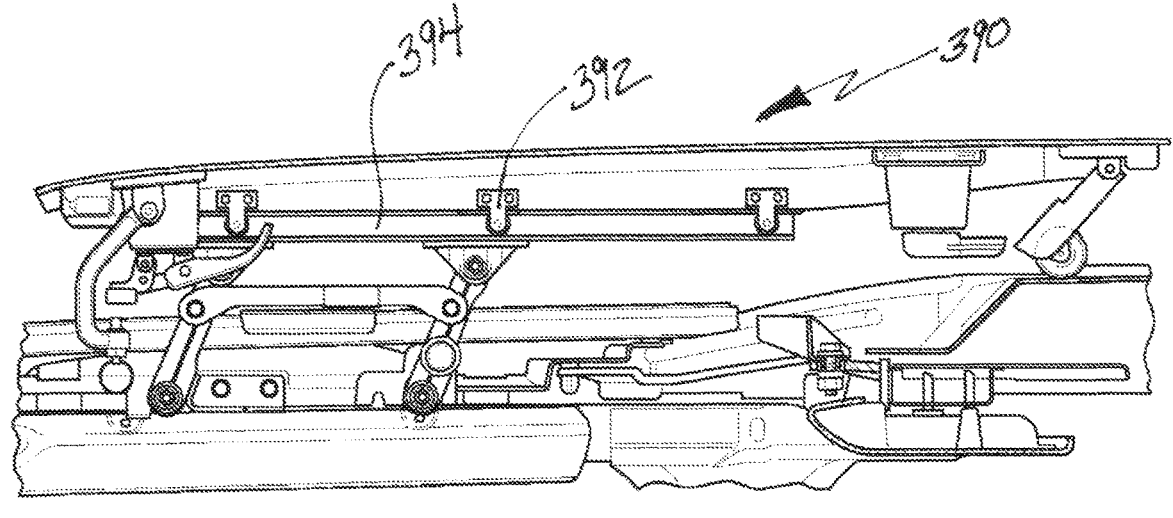
FIG. 24A is a side elevational view with a single roller slide retracting rail.
Figure 24B:
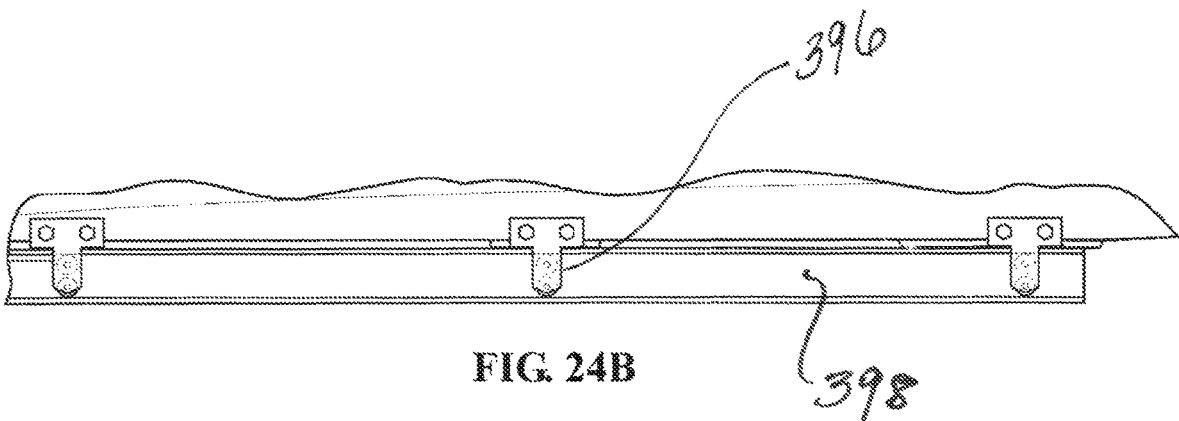
FIG. 24B is a side elevational view with a double roller slide retracting rail.

FIGS. 24A and 24B show a single rolling slide 392 or a double roller slide 396 in a track 394 or formed in a receiving track 398, respectively sized to accommodate the single roller of FIG. 24A or the double roller slide or bearing 396 of FIG. 24B. Such roller slides or bearings 392 and 396 may reduce resistance and drag. Due to the location within the mechanism, dirt and road dust will be less likely to become clogged or otherwise be damaged so as to impede smooth gliding during retraction and re-closing.

Figures 25A, 25B:
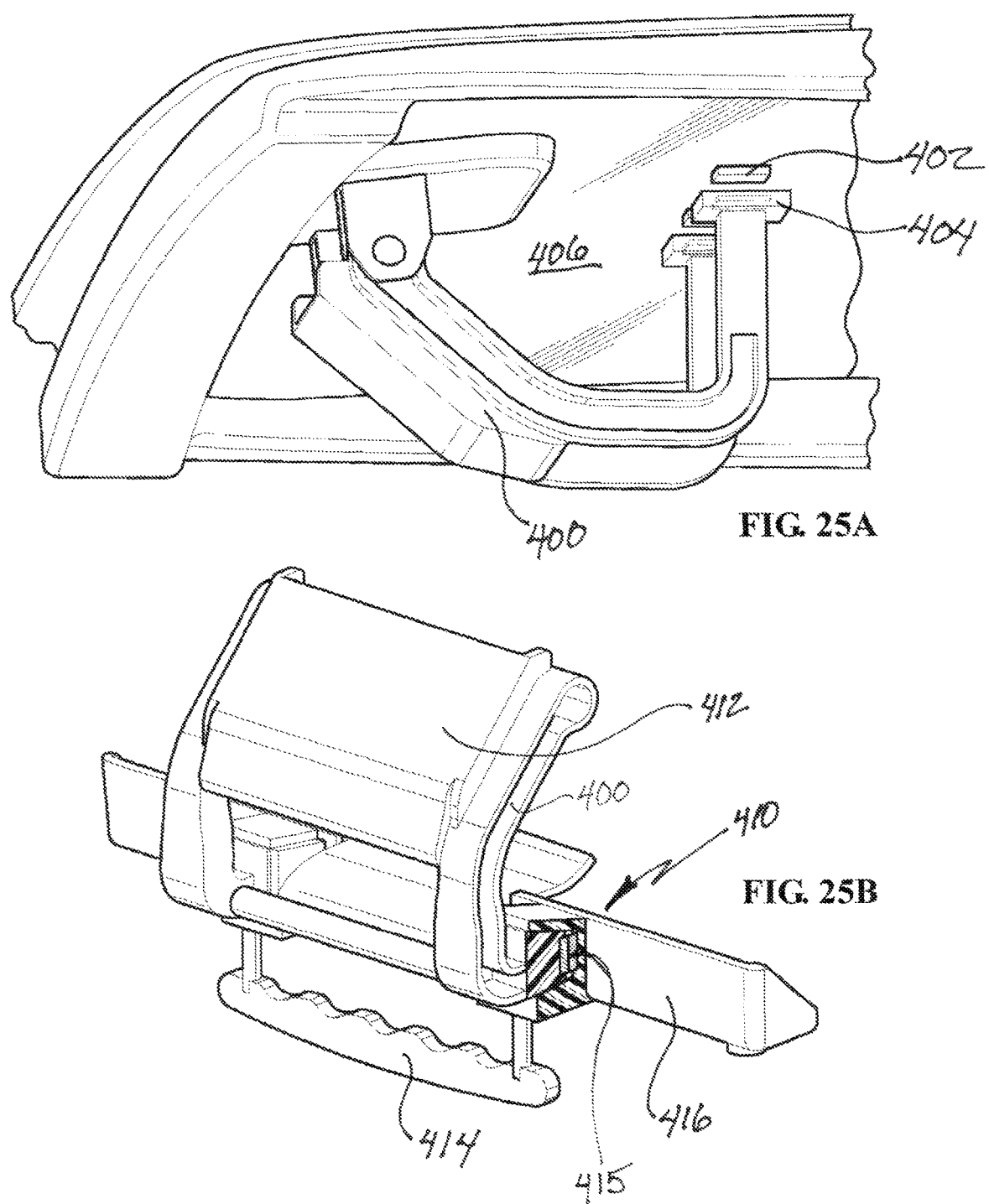
FIG. 25A shows a retracting handle with magnetic positioners.
FIG. 25B shows a retracting handle with magnetic positioners in a partial cutaway.

Looking toward FIGS. 25A and 25B, several views of retracting handle 400 show the pivotal attachment to the underside of hard roof panel 406. In order to swing handle 400 out of the way, magnets 404 located therein are located to mate with magnets 402 adhered to the underside of hard roof panel 406, holding retracting handle 400 up and out of the way. FIG. 25B is a different view 410 of retracting handle 400 with finger catch 412 and magnets 415 (shown as cross sectioned within a partial cutaway) Mounting bracket 416 is an installed bracket into pre-existing factory installed cavities. Note that no modifications need to be made to the factory vehicle configuration, rather, mounting bracket 416 has been manufactured in accordance with the present invention and adapted to fit to the pre-existing cavities from the factory. Mounting bracket can be bolted into the pre-existing factory cavities with common hand tools.

Figure 26A:
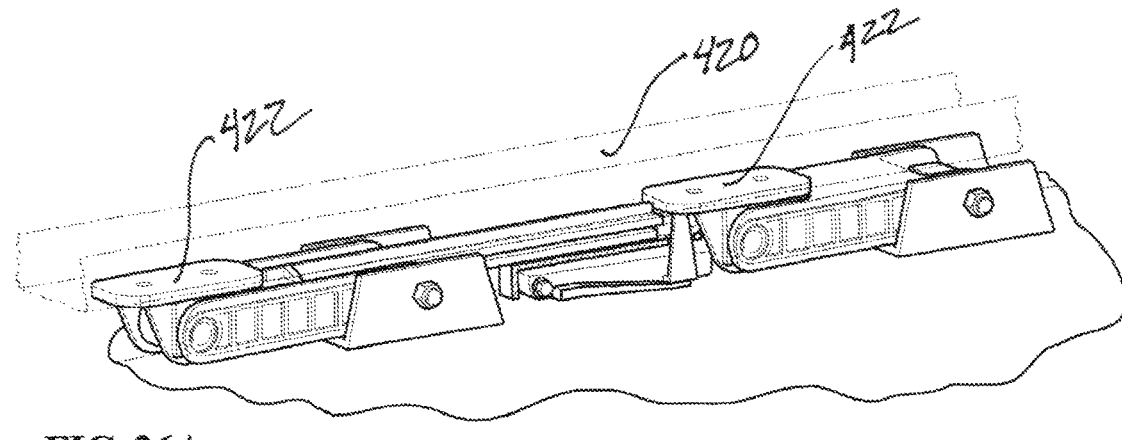
FIG. 26A is a perspective view a magnetic drop down locking support in its closed position.
Figure 26B:
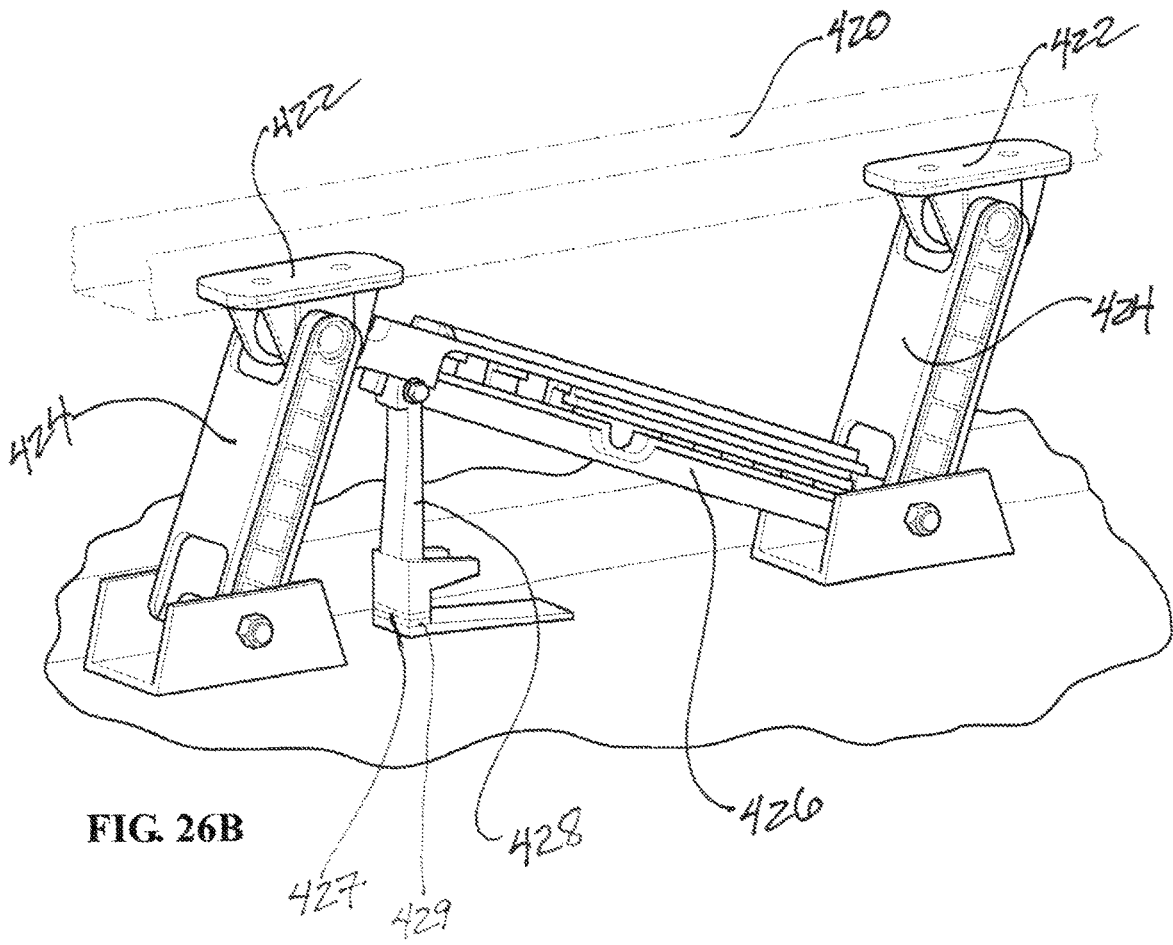
FIG. 26B is a perspective view a magnetic drop down locking support in its open position.

FIGS. 26A and 26B show two views of the lifting assembly in first a closed position of FIG. 26A, then the lifted and open position of 26B. A mounting rail 420 shown in phantom in FIG. 26A is shown on top of attachment brackets 422. A hard roof panel in accordance with the present invention is not shown, but is located on top of mounting rail 420. In the lifted and retracting position of FIG. 26B, lifting struts 424 are connected with cross member arm 426. Cross member arm 426 includes a drop down locking support 428 having magnets 427 that find their way to connect with mating magnets 429 underneath. When the hard roof panel atop mounting rail 420 is moved toward the closed position, drop down locking support 428 separates the magnets and it automatically folds up under cross member arm 426, ready for the next retraction.

Figures 27A, 27B:
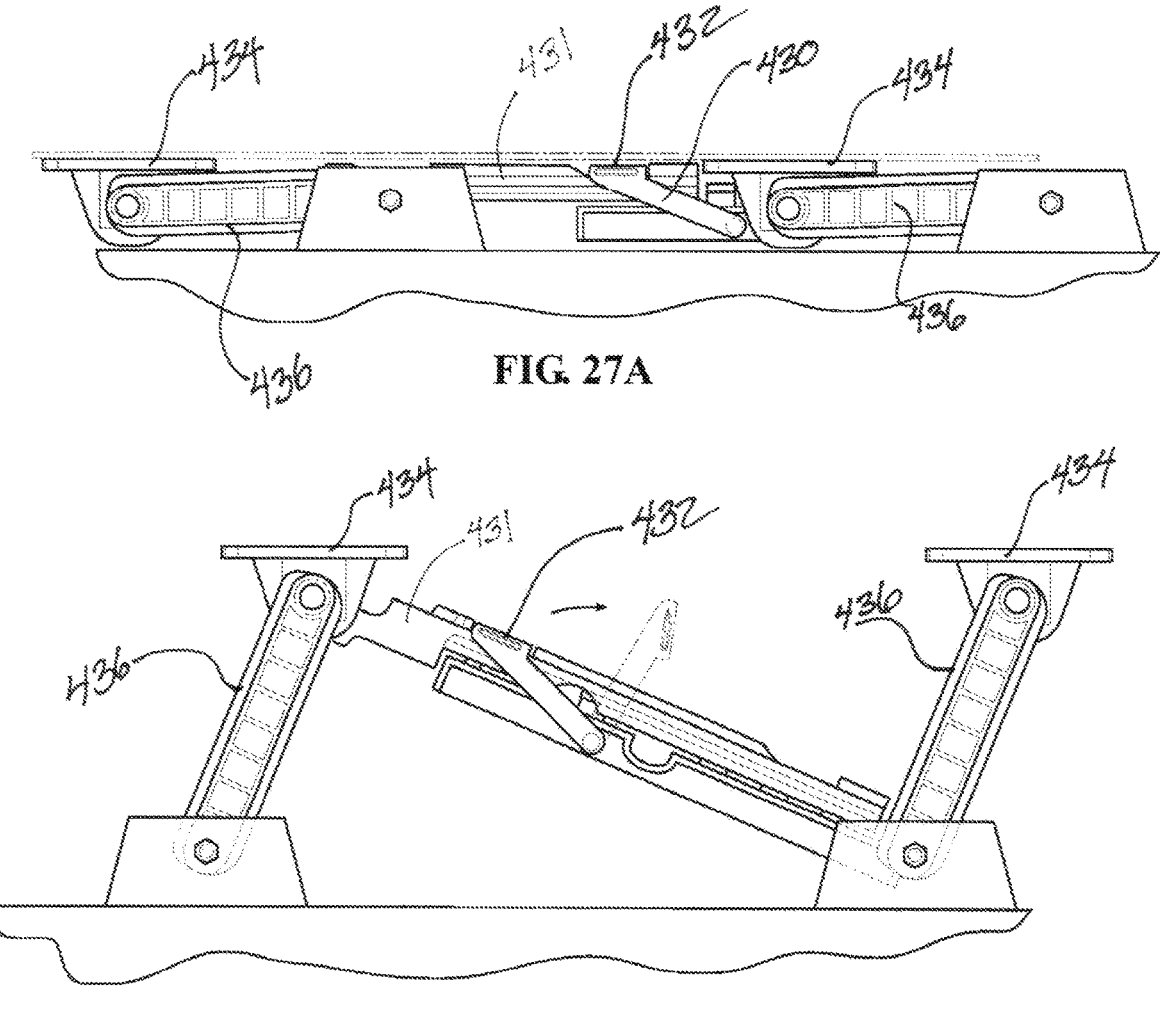
FIG. 27A is a side elevation view of yet another aspect of a locking mechanism while in its closed position.
FIG. 27B is a side elevational view of yet another aspect of the locking mechanism of FIG. 27A while in its open position.

FIGS. 27A and 27B show yet another aspect of the present invention with a sliding arm 430 having a protruding handle 432 that an occupant within the cabin interior of the vehicle can easily reach and push upwardly to unlock cross member arm 431, allowing lifting struts 436 to be lifted. Attachment brackets 434 are connected to a hard roof panel (not shown on top), thereby retracting the hard roof panel into an open position for the open air experience, capable of quickly locking closed in the event of a sudden rainstorm, all without the occupant having to get out of the vehicle, but rather activating from within the cabin interior while in a seated position.

Figure 28A:
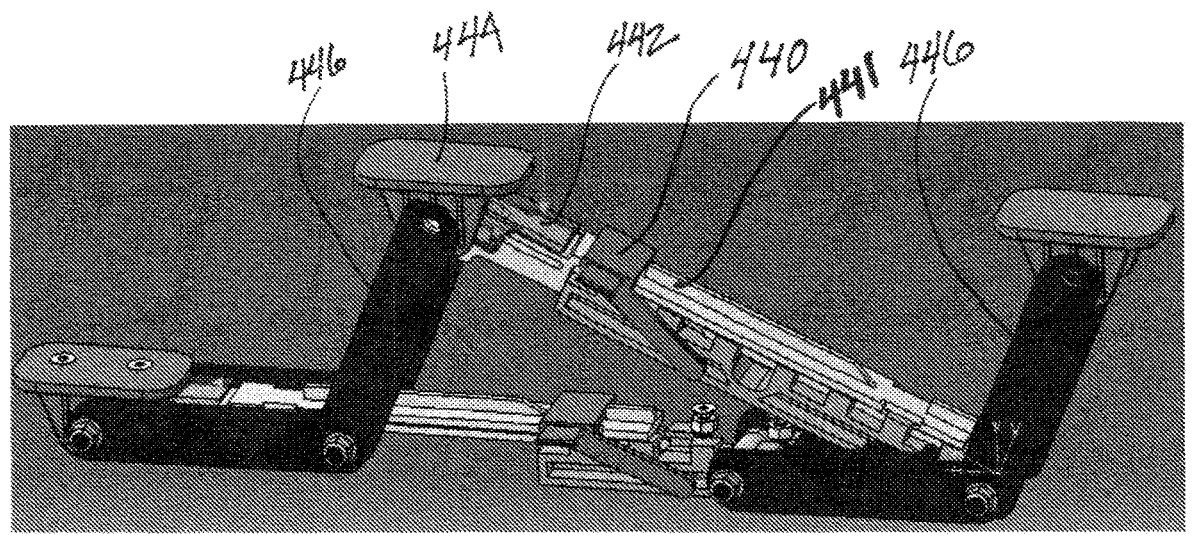
FIG. 28A is a side elevational view of another aspect with a sliding latch.
Figure 28B:
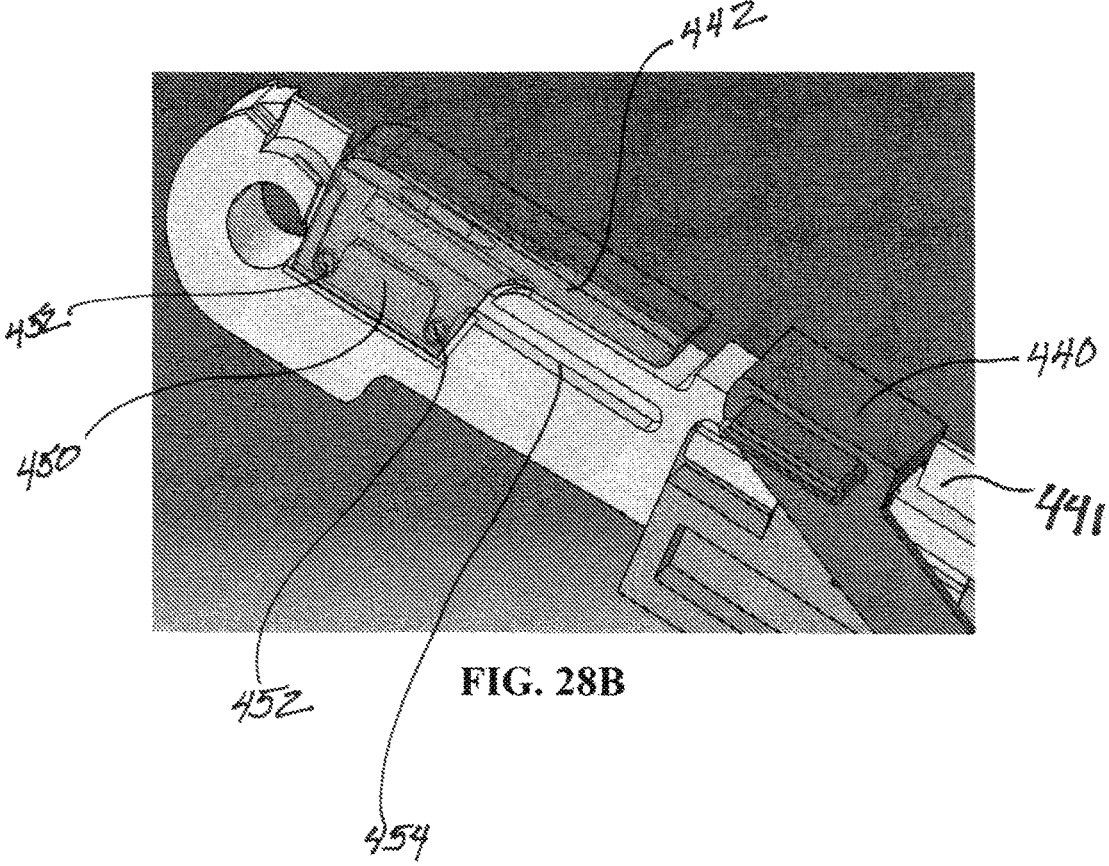
FIG. 28B is a side perspective view of the sliding latch aspect of FIG. 28A in greater detail.
Figures 28C, 28D:
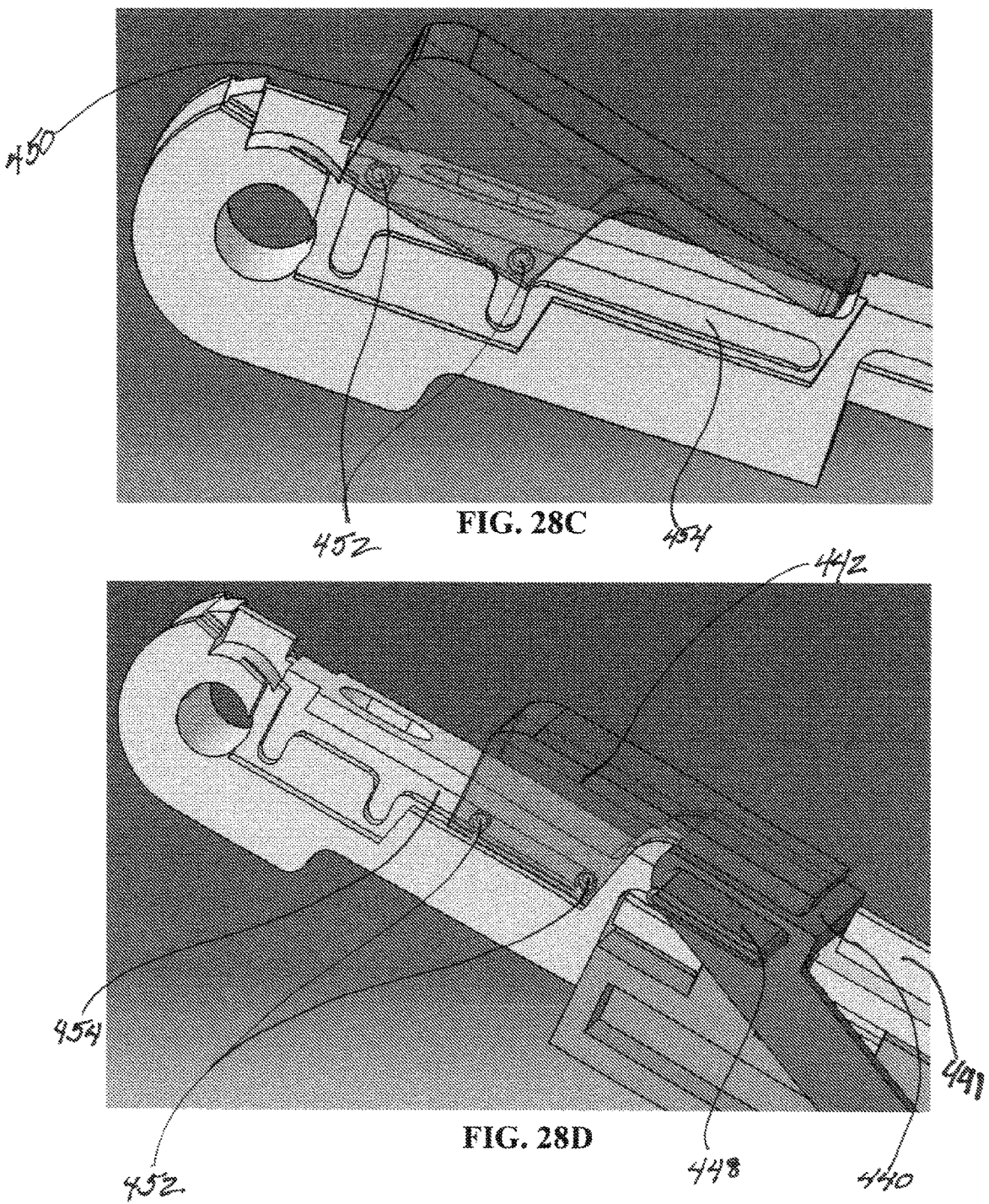
FIG. 28C is a side perspective view of the sliding latch aspect of FIG. 28A in greater detail during operation.
FIG. 28D is a side perspective view of the sliding latch aspect of FIG. 28A covering a locking arm.

Looking lastly to the sequence of FIGS. 28A-28D, there can be seen yet another aspect of the present invention with a novel sliding latch lock mechanism 442 working in conjunction with the sliding arm 430 of the previous FIG. 27A-27B. Lifting struts 446 are maintained in an upward position when the hard roof panel is retracted by a sliding latch lock 442. Sliding arm 440 is caught in place by abutting against slide catch 441. FIG. 28B shows sliding latch lock mechanism in its downward position with a side cover portion 450 having magnets 452 maintaining its position with relation to track 454. FIG. 28C shows side cover 450 with magnets 452 being lifted by occupant, leveling out and being slid backward into track 4454. Thereafter, sliding latch locking mechanism 442 is slid back into position over top of sliding arm 440, without covering protruding handle 448, thereby keeping sliding arm 440 from disengaging, and locking it against slide catch 441.

Clearly, this design can be modified to be adapted for retractable hard roof panel assemblies on other types of vehicles, including boats, rail cars, subways, trains, or any other vehicles that might desire a non-motorized self-storing retractable roof. Such modifications can be envisioned by one of ordinary skill in the art and adapted for each type of those vehicles without undue experimentation.

The foregoing description of a number of preferred aspects of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated.

INDUSTRIAL APPLICABILITY

The present invention finds utility in the sport vehicle industry for providing a retractable hard roof panel for sport vehicles that can be installed easily without tools.

What is claimed is:

1. A retractable roof assembly for vehicles with an original factory vehicle roof, a cabin interior and a factory vehicle structure, comprising:

a non-motorized semi-permanent hard panel retractable roof that is removably mountable to the factory vehicle structure of the vehicle, said hard panel retractable roof being operatable from inside the vehicle;

a handle secured to the hard panel retractable roof functioning to articulate in up and down positions for safety and visibility:

said handle locking in the up and down positions for safety, ergonomic operation, and force multiplication such that the retractable roof assembly may be locked in the up and down position:

a locking mechanism to lock the roof assembly in an open position to provide an open-air experience;

said handle providing support to counter air flow, cross vehicle forces, and terrain created forces.

2. The retractable roof assembly of claim 1, wherein the hard panel retractable roof may be retracted rearwardly and locked in the up or down position safely by manually opening and closing from within the cabin interior and said hard panel retractable roof being semi-permanently installed on the vehicle.

3. The retractable roof assembly of claim 1, further comprising vehicle structure attachment brackets mountable to the vehicle, and said attachment brackets also being attached to the hard panel retractable roof, whereby the hard panel retractable roof is semi-permanently attached to the vehicle.

4. The retractable roof assembly of claim 1, further comprising at least one non-motorized articulating and locking mechanism for lifting and retracting the hard panel retractable roof rearwardly to expose a portion of the interior of the vehicle to the outer elements, and locking the roof assembly into the up or down position safely and securely to prevent sliding backward or forward during operation.

5. The retractable roof assembly of claim 1, wherein said hard panel retractable roof is made of suitable materials including at least one of clear glass, opaque, transparent, translucent hard composite polycarbonates, glass, tempered glass, Gorilla Glass®, metal, fiberglass and combinations thereof.

6. The retractable roof assembly of claim 5, wherein said hard panel retractable roof is made of clear tempered glass.

7. The retractable roof assembly of claim 1, wherein said hard panel retractable roof is surrounded by an encapsulating member to enable attachment to vehicle structure attachment brackets.

8. The retractable roof assembly of claim 1, further comprising at least one locking mechanism to secure the retractable hard roof panel in an open position, wherein said locking mechanism can be selected from the group consisting of a T-shaped plunger, a drop down locking support with magnets, a sliding arm having a protruding handle, a toggle locking mechanism, a torsion spring mechanism and combinations thereof.

9. The retractable roof assembly of claim 8, wherein the locking mechanism includes a magnetic locking mechanism for securing the retractable roof assembly in an open position.

10. The retractable roof assembly of claim 8, wherein the locking mechanism includes a lock latch mechanism.

11. The retractable roof assembly of claim 8, wherein the locking mechanism includes a toggle locking mechanism.

12. The retractable roof assembly of claim 4, wherein the at least one non-motorized articulating mechanism for lifting and retracting the hard panel retractable roof rearwardly to expose a portion of the interior of the sport vehicle to the outer elements includes a torsion spring mechanism to assist lifting and retracting.

13. The retractable roof assembly of claim 4, wherein the at least one non-motorized articulating mechanism for lifting and retracting the hard panel retractable roof rearwardly to expose a portion of the interior of the vehicle to the outer elements includes at least one lifting strut to assist lifting and retracting.

14. The retractable roof assembly of claim 4, wherein the at least one non-motorized articulating mechanism for lifting and retracting the hard panel retractable roof rearwardly to expose a portion of the interior of the sport vehicle to the outer elements includes a hydraulic strut to assist lifting and retracting.

15. The retractable roof assembly of claim 1, the handle being for a driver in the cabin interior to retract the hard roof panel.

* * * * *